United States Patent
Clarke et al.

(10) Patent No.: US 10,562,198 B2
(45) Date of Patent: Feb. 18, 2020

(54) RAZOR CARTRIDGE WITH NON-CUTTING ELEMENT

(75) Inventors: Sean Peter Clarke, Highmoor Cross (GB); Ashok Bakul Patel, Needham, MA (US); Matthew Robert Stone, Oxford, MA (US)

(73) Assignee: The Gillette Company LLC, Boston, MA (US)

( * ) Notice: Subject to any disclaimer, the term of this patent is extended or adjusted under 35 U.S.C. 154(b) by 917 days.

(21) Appl. No.: 12/968,433

(22) Filed: Dec. 15, 2010

(65) Prior Publication Data

US 2011/0146079 A1    Jun. 23, 2011

Related U.S. Application Data

(60) Provisional application No. 61/287,722, filed on Dec. 18, 2009.

(51) Int. Cl.
*B26B 21/22* (2006.01)
*B23P 15/44* (2006.01)
(Continued)

(52) U.S. Cl.
CPC ........ *B26B 21/222* (2013.01); *B26B 21/4012* (2013.01); *B26B 21/4018* (2013.01); *B26B 21/4031* (2013.01); *B26B 21/4043* (2013.01); *B26B 21/4068* (2013.01); *B26B 21/443* (2013.01); *Y10T 29/49826* (2015.01)

(58) Field of Classification Search
CPC .............. B26B 21/222; B26B 21/4012; B26B 21/4018; B26B 21/4031; B26B 21/4043; B26B 21/4068; B26B 21/443; Y10T 29/49826

USPC .............. 30/50, 51, 54, 55, 59, 63, 65, 74.1, 30/77–80, 34.2
See application file for complete search history.

(56) References Cited

U.S. PATENT DOCUMENTS 4,272,885 A * 6/1981 Ferraro .............................. 30/47
4,403,413 A * 9/1983 Trotta .............................. 30/47
(Continued)

FOREIGN PATENT DOCUMENTS

EP           1 646 481 B1      4/2008

*Primary Examiner* — Stephen Choi
(74) *Attorney, Agent, or Firm* — Joanne N. Pappas; Kevin C. Johnson

(57) ABSTRACT

A novel razor cartridge includes at least one non-cutting element disposed anywhere within a blade array between a guard and a cap and/or in a blade position of a frame providing skin/hair management. This non-cutting element allows the fine-tuning of parameters such as blade-skin contact, hair orientation, blade spans and rinse-through gaps in manners that improve shaving comfort, closeness, efficiency, and/or rinse-ability. The non-cutting element may include projections, fin-like elements, comb-like features having teeth, exfoliation or lubricating capabilities. By having a fixed non-cutting element disposed midway in a blade array, a multi-stage cartridge is provided with a middle control point with potentially different functionality before and after the non-cutting element. The non-cutting element is not attached to another blade in the blade array though it may be manufactured as a modified blade support, attached to a blade support, or as part of the frame or the clips.

22 Claims, 33 Drawing Sheets

(51) Int. Cl.
*B26B 21/40* (2006.01)
*B26B 21/44* (2006.01)

(56) References Cited

U.S. PATENT DOCUMENTS

| | | | | |
|---|---|---|---|---|
| 4,774,765 | A * | 10/1988 | Ferraro | 30/50 |
| 5,301,425 | A * | 4/1994 | Ferraro | 30/42 |
| 5,359,774 | A * | 11/1994 | Althaus | 30/50 |
| 5,416,974 | A * | 5/1995 | Wain | 30/50 |
| 5,802,721 | A * | 9/1998 | Wain et al. | 30/34.2 |
| 6,161,288 | A * | 12/2000 | Andrews | 30/50 |
| 6,173,498 | B1 * | 1/2001 | Warrick et al. | 30/50 |
| 6,216,349 | B1 * | 4/2001 | Gilder et al. | 30/346.57 |
| 6,243,951 | B1 * | 6/2001 | Oldroyd | 30/34.2 |
| 6,397,473 | B1 * | 6/2002 | Clark | 30/50 |
| 6,434,828 | B1 * | 8/2002 | Andrews | 30/50 |
| 6,550,141 | B1 * | 4/2003 | Rivers et al. | 30/50 |
| 7,111,401 | B2 * | 9/2006 | Richard | 30/50 |
| 2004/0231161 | A1 * | 11/2004 | Coffin et al. | 30/50 |
| 2005/0039337 | A1 * | 2/2005 | Pennell et al. | 30/346.5 |
| 2005/0246898 | A1 * | 11/2005 | Gilder | 30/34.2 |
| 2006/0112564 | A1 * | 6/2006 | Coffin | 30/50 |
| 2006/0277759 | A1 | 12/2006 | Follo | |
| 2009/0083982 | A1 * | 4/2009 | Forsdike | 30/34.2 |

* cited by examiner

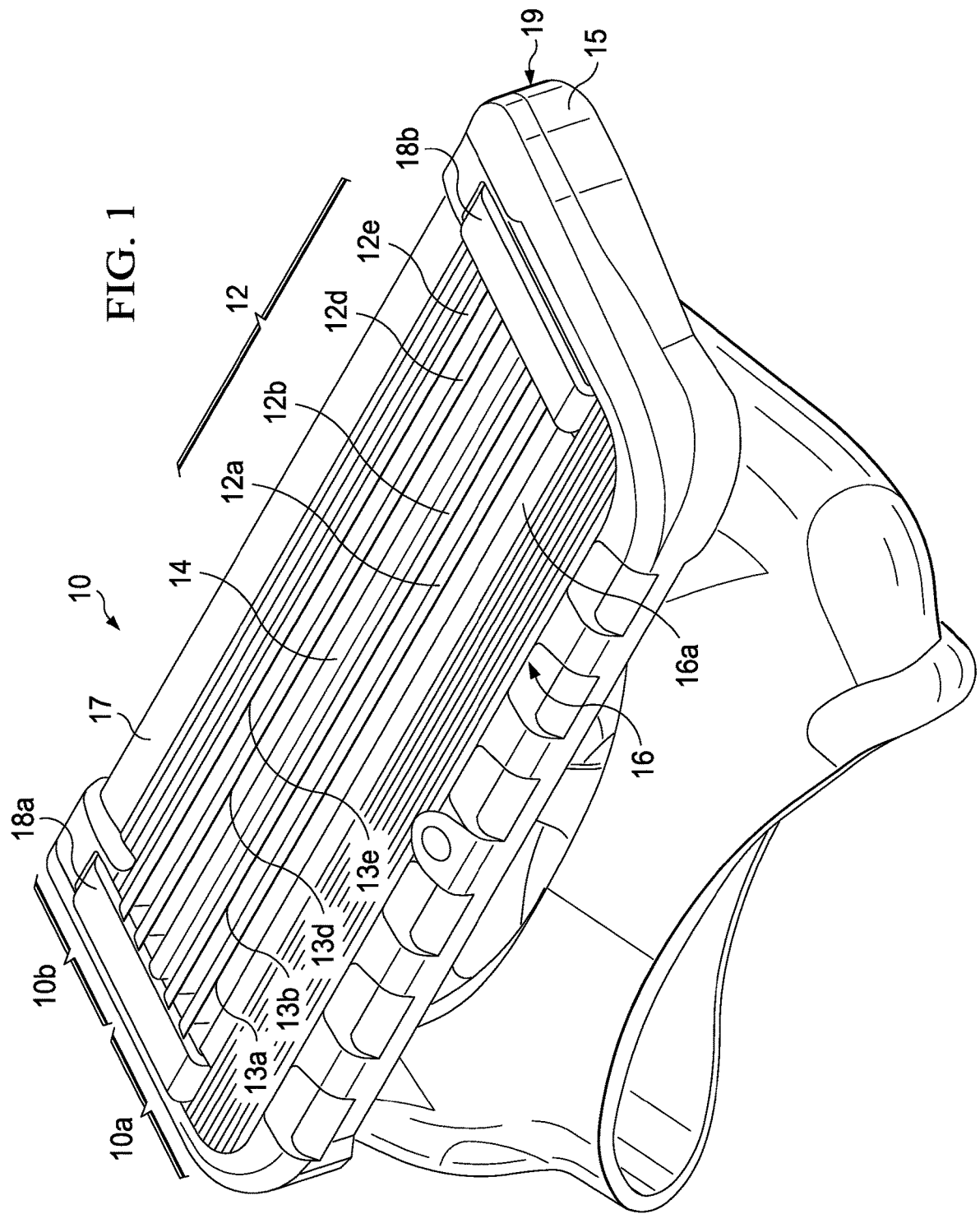

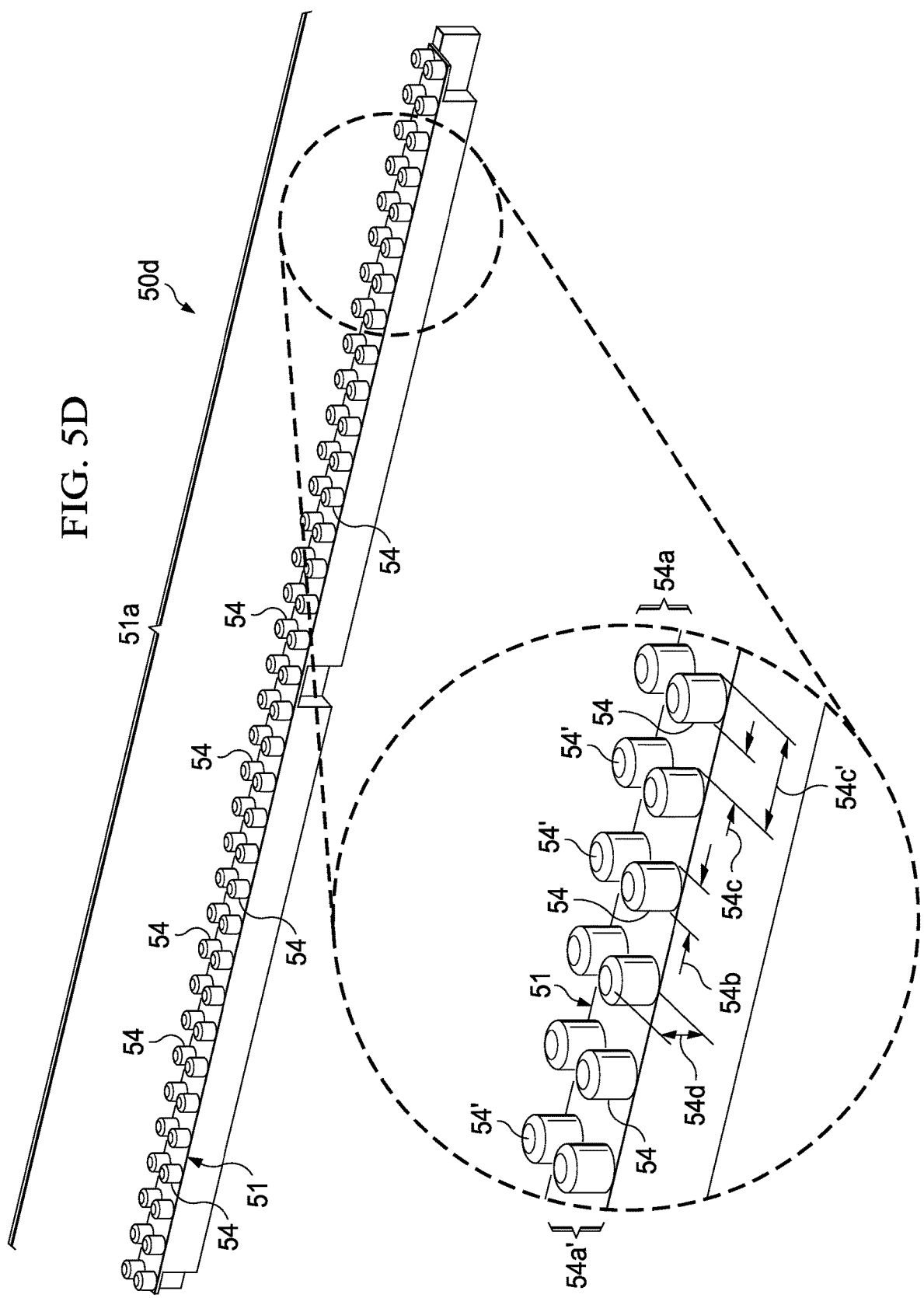

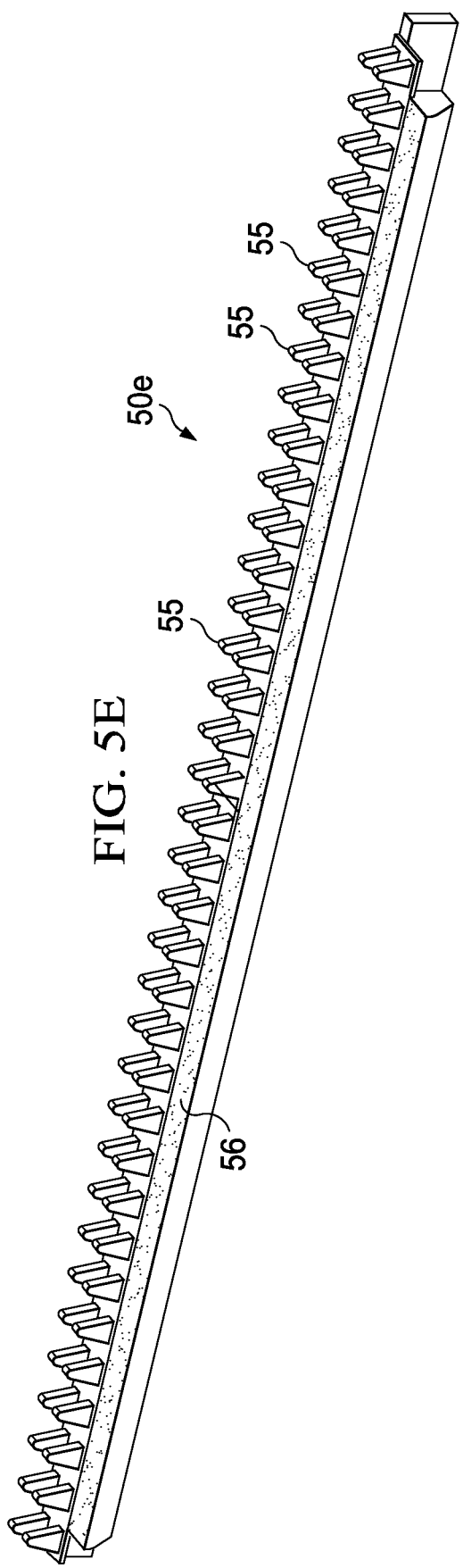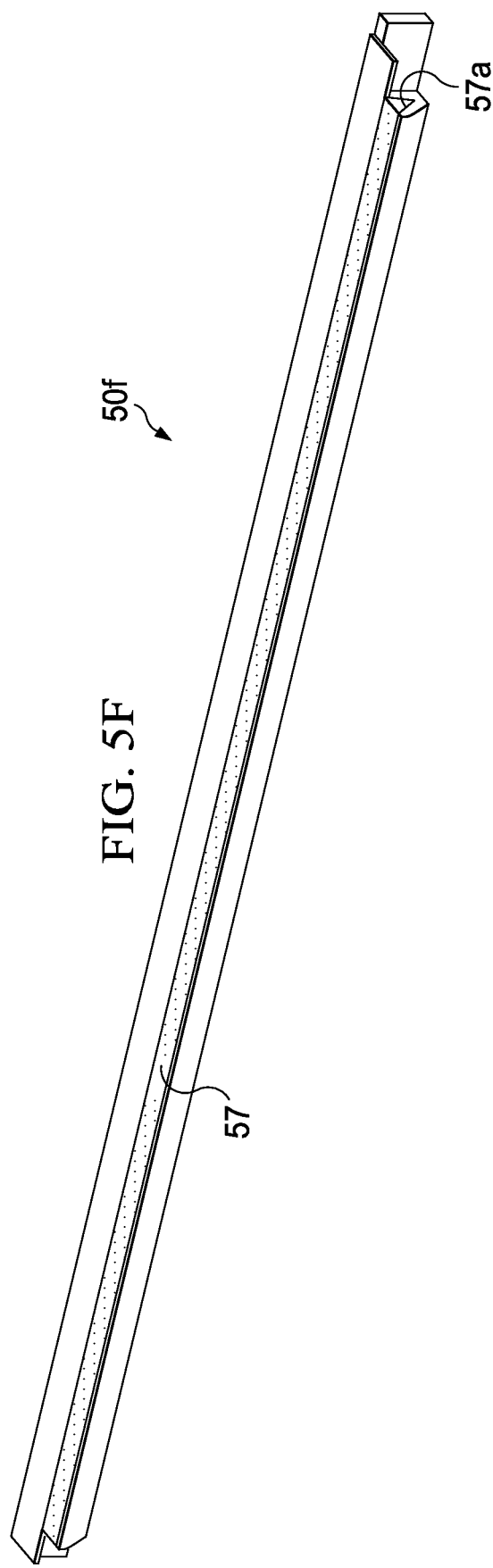

RAZOR CARTRIDGE WITH NON-CUTTING ELEMENT

CROSS REFERENCE TO RELATED APPLICATIONS

This application claims the benefit of U.S. provisional application No. 61/287,722, filed Dec. 18, 2009.

FIELD OF THE INVENTION

This invention relates to razor blades, and more particularly to a razor cartridge having at least one non-cutting element.

BACKGROUND OF THE INVENTION

Many razors for wet shaving on the market today have one or more razor blades (with many having three to six razor blades) within a razor cartridge which is operatively coupled to a handle, some razors being disposable and some razors having a reusable handle. Razor cartridges having multiple blades are described, for instance, in US Patent Publication No. 2005/0039337A1 published on Feb. 24, 2005, and one such razor cartridge has been commercialized as the five bladed Fusion™ Razor by The Gillette Company.

While multiple blades provide an improved close shave, generally some performance issues may still arise. Firstly, some discomfort may be realized by users during shaving. Secondly, shaving is still a relatively slow and inefficient process due to missed hairs and the difficulty in shaving problem areas such as the neck. Many shavers discern a substantial amount of missed hairs (e.g., hairs which are not cut at all or hairs that are not cut close to the skin or at the skin line) despite the bulk of hairs being cut.

In addition, it has been shown that some areas (e.g., neck, chin, and/or face) are particularly hard to shave. These areas generally have low-lying hairs that are often oriented in different directions. These low-lying hairs may be close, flat, or flush against the skin. In many instances, the user has to shave the same area repeatedly in attempting to cut hair that was either uncut or not cut close enough to the skin, resulting in increased skin irritation.

The discomfort aspect may be due to the increased number and sharpness of the blades and the cumulative force or loading on the skin, particularly in cartridges with three or more sharp blade edges.

Some prior art solutions which attempt to lessen the discomfort while maintaining safety and closeness provide, among other attributes, a reduced span of the blades from tip to tip, often referred to as the blade tip span. While such a reduction is generally known to provide better skin management by reducing the skin bulge between blades, it is also known to reduce the rinse-ability of hair clippings, skin particles, shaving cream, and/or other debris between the blades as the narrower spans decrease the size of the rinse-through gaps between the blades.

Rinse-through gaps, as generally known in the shaving arts, represent the shortest distance or narrowest point between two blades or between a blade and a fixed point such as the guard or the cap and typically, rinse-through gaps are shorter in length than the blade tip span. Advantageously, rinse-through gaps generally allow the user to place the razor cartridge under flowing water to permit water to enter one side of the rinse-through gap and push the hair clippings, etc. through to the other side of the gap.

One prior art reference, entitled Inter-Blade Guard and Method of Manufacturing Same, Ser. No. 11/150,744, filed on Jun. 10, 2005, attempts to improve comfort by reducing skin bulge while maintaining rinse-ability. It provides an inter-blade guard element disposed on the blade itself and provides a rinse-through gap immediately after the skin-engaging element across the length of the blade. One disadvantage of this prior art solution is that the inter-blade guard element is necessarily joined to a razor blade element and hence, not in and of itself an independent element in the razor cartridge. This in turn may limit the rinse-ability as it only provides a rinse-through gap or area between the inter-blade element and the blade immediately after, and not also before (e.g., on both sides of) the inter-blade element. It may also increase time and cost to manufacture such an inter-blade element onto the blades.

Another similar prior art solution discloses skin contacting portions connected to the blade and blade supports in a razor cartridge and hence, has similar disadvantages. For instance, see U.S. Pat. No. 6,243,951, entitled Safety Razors, issued on Jun. 12, 2001, and assigned to the Assignee hereof.

Another prior art solution attempts to improve the efficiency of shaving by providing a bidirectional razor head with a centrally located lubricating strip. For instance, see U.S. Pat. No. 6,161,288, entitled Four Blade Bi-Directional Razor Structure with Flexible Guard System, issued on Dec. 19, 2000. This solution, however, does not provide improved shaving attributes or advantages for a conventional razor cartridge which typically provides all blades facing in only one direction.

Thus, while many prior art solutions attempt to improve comfort and efficiency, they do not adequately provide an answer to the problem of increasing the number of hairs cut and/or the ability to shave problem areas efficiently (e.g., neck, chin).

Thus, there is still a need to improve skin and hair management (e.g., comfort and efficiency) in razor cartridges while maintaining or improving shaving attributes such as closeness and rinse-ability.

SUMMARY OF THE INVENTION

The invention provides a razor cartridge including one or more razor blades, each of the blades having a cutting edge; at least one non-cutting element; and a plurality of blade positions on a frame, wherein each one of the plurality of razor blades and each of the at least one non-cutting elements is disposed in a separate one of the plurality of blade positions.

The invention provides a razor cartridge including a blade array having one or more razor blades, each of the blades having a cutting edge; and at least one non-cutting element disposed in the blade array wherein the at least one non-cutting element is not attached to any of the blades.

The invention provides a razor cartridge including a first stage having a guard, a plurality of razor blades and a non-cutting element; and a second stage comprising the non-cutting element, a plurality of razor blades and a cap, wherein the non-cutting element is disposed anywhere between the guard and the cap.

The invention provides a method of manufacturing a razor cartridge including coupling a non-cutting element with a razor component in a position of the cartridge, and inserting a plurality of razor blades in remaining positions of a frame, wherein the razor component is a frame or at least one clip or any combination thereof and the coupling further includes injection molding, mechanical, or chemical attachment, or any combination thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

FIG. 1 is a perspective view of a razor cartridge showing a non-cutting element therein in accordance with the present invention.

DETAILED DESCRIPTION OF THE INVENTION

Figure 1A:
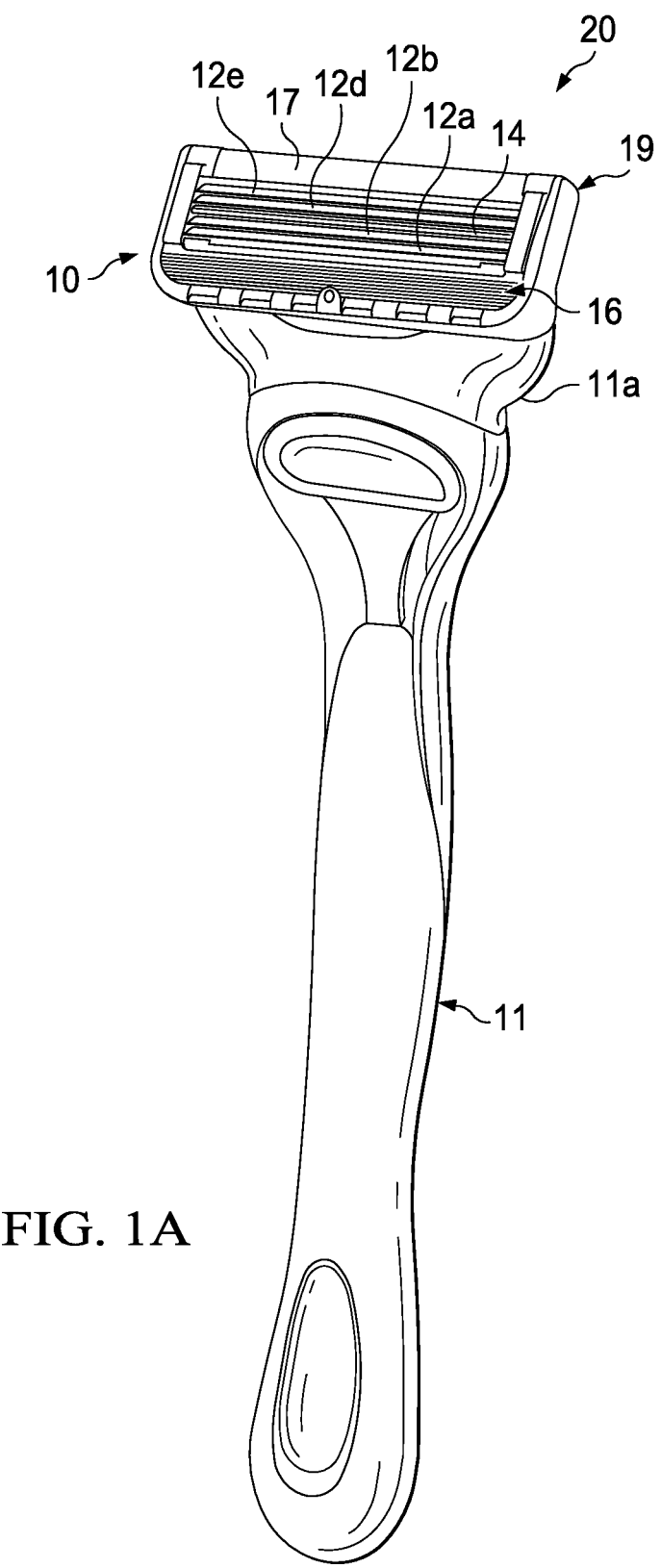
FIG. 1A is a perspective view of the razor cartridge of FIG. 1 shown attached to a handle.

This invention relates to a novel razor cartridge in a razor for wet shaving where at least one non-cutting element is disposed within a blade array. For instance, in one desirable embodiment, the non-cutting element is disposed in one of the blade slots or blade positions. By replacing a blade with a non-cutting element in this manner, comfort and efficiency improvements are realized while maintaining or improving closeness and/or rinse-ability and with little additional cost or time.

For instance, in some embodiments, the novel non-cutting element improves comfort by reduction of blade pressure on the skin (e.g., due to negative exposure), while in other embodiments the present invention provides improved efficiency where hard-to shave areas are dealt with via hair aligning features on the non-cutting element.

In the present invention, certain germane terms are defined as follows:

The term "non-cutting element" signifies a physical structure which generally does not cut hair or skin but contacts, engages, controls, enhances, agitates or stretches a user's skin and/or hair providing skin management (e.g., reduction of skin bulge) and/or hair management (e.g., alignment of hairs) during shaving and which may be of any type, size, shape or geometry including, but not limited to, having a portion or an upper surface with at least one feature selected from the group consisting of a plurality of projections defining at least one open slot, protrusions, elongated filaments, nubs, fins, waves, curves, depressions, hair-like elements, one or more hook-like structures, one or more lubricating strips, one or more foams, one or more exfoliation materials, one or more shaving aid materials, one or more comb-like features having a plurality of teeth, any of the aforementioned spaced apart or interconnected, constant or variable in dimensions, or any combinations thereof. The non-cutting element of the present invention may have features that are, but not limited to, upstanding, curved, angled right, angled left, or angled to a center and which may be flexible, rigid, or semi-rigid, may have planar or non-planar surfaces, may be contiguous, non-contiguous, patterned, or be any combination thereof.

The non-cutting element of the present invention may be made of any type of material such as, but not limited to, polymeric, elastomeric, thermoplastic elastomers, urethanes, olefins, rubbers, metals, or any combination thereof. Elastomers such as silicone, fluorosilicone, polyisoprene, polybutadiene, polyisobutylene, copolymers such as styrene-ethylene-butylene-styrene (SEBS) based thermoplastic elastomer, styrene-ethylene-propylene-styrene (SEPS) based thermoplastic elastomer, polyoxyethylene-polyurethane based elastomer, or other polymers such as polyurethane, polystyrene and polyethylene, or rubbers such as acrylonitrile-butadiene, polyacrylate and natural rubber, or any combination thereof are also contemplated in the present invention. Additionally, the non-cutting element material may include modifications of one or more of the above-listed materials (e.g., polymers and rubbers and their composites) with other materials.

If made of a polymeric or other elastomeric material, the non-cutting element may be injection-molded. If made of metal, such as aluminium or stainless steel, the non-cutting element may be machined or tooled.

Furthermore, the materials for a non-cutting element may include textile or fabric materials, natural materials (e.g., wood), or metals coated or integrated with elastomeric or plastic materials.

The non-cutting element of the present invention may additionally include materials with exfoliation capabilities (e.g., such as fine grade abrasive coatings, chemicals, or surface texture) providing an exfoliation member and may additionally include materials with chemicals affecting the skin or hair (e.g., skin improvement, such as but not limited to, lubrication or sensation, hair management, such as but not limited to, growth minimization or extension, conditioning), or any combination thereof.

Furthermore, the non-cutting element may include a lubrication body such as soap, a sponge or foam embedded or coated with shaving aid material or other chemistries, or an elastomeric guard-like structure embedded or coated with a layer of shaving aid material or other chemistries. The foam may be basic foam or sponge material or a gradient foam as disclosed in U.S. patent application Ser. No. 12/350,286 entitled Fluid Delivery System and in U.S. patent application Ser. No. 12/350,446 entitled Hair Removal with Fluid Delivery assigned to the Assignee of the instant invention.

The term "shaving aid material" as used herein signifies any composition for use with skin and/or hair. Such compositions may include, but are not limited to, lubricious agents such as hydrophilic polymers (e.g., polyethylene oxide/polystyrene or PEO/PS), or agents for depilation, cleaning, cooling, inhibiting or enhancing the growth of hair, inhibiting the growth of microbes, inhibiting drag, inhibiting wrinkles, moisturizing, improving skin tone or condition, medicinal purposes, or any combination thereof. Agents may include, but are not limited to, ingredients such as aloe, vitamin E, lanolin, perfumes, or glycolic acids.

The chemistries disposed in the non-cutting element may interact with the chemistries found in the cap or the guard of the razor cartridge. Additionally, the non-cutting element of the present invention may serve as a wear-indicator.

A "blade array" as used herein is defined as an array of one or more razor blades (e.g., generally multiple blades), each blade having a cutting edge where each cutting edge is generally facing in the same direction. Blade cutting edge or blade edge may be used interchangeably with blade tip herein, where a blade tip may represent a point on a blade edge. The novel razor cartridge may be considered as having a "mixed blade array" with mixed functionality in that there are cutting and non-cutting elements in the array.

It is generally known that skin and/hair management may be critical to improving the performance of a shave. Thus, skin and hair management, in general, or the way in which a blade contacts or is "presented" to the skin/hair is an important facet of the present invention.

One factor which affects how a blade is presented to the skin is the exposure or the amount a blade is pressed into or lifted away from the skin impacting the blade loading on the skin. Another factor which affects how a blade is presented to the skin is the span between elements (e.g., such as between blades), which impacts the skin bulge ahead of the blade, and also impacts the blade loading on the skin.

It is also known in the shaving arts that, in addition to exposures and spans, the management of skin and hair may also be affected by many additional inter-related variables such as the number of blades in a razor cartridge, the types of blades, and the angles of the blades relative to the skin line.

The non-cutting element of the present invention has the ability to provide additional control of these inter-related variables in the blade array impacting both skin and hair management. For instance, the non-cutting element may manage hair by orienting or aligning hairs and/or controlling hair flow in such a way that hair may be fed across the blades, while also providing an improved control point for the blade loading on the skin.

Additionally, it should be noted that the non-cutting element of the present invention may be utilized in any type of razor cartridge and thus naturally in both male and female type razors.

Various embodiments of the present invention are described below.

Referring now to FIG. 1, a razor cartridge 10 having a blade array 12 comprising four blades, 12a, 12b, 12d, and 12e, each having respective cutting edges 13a, 13b, 13d, 13e, and a non-cutting element 14 disposed in between two of the blades 12b and 12d is provided in accordance with the present invention. Thus, the novel razor cartridge may be considered as having a "mixed blade array" with mixed functionality in that there are cutting and non-cutting elements in the array.

It should be noted that, generally, the guard 16 (and/or guard bar 16a) of a razor cartridge 10 disposed at the front of the cartridge are known to produce higher friction at the front of the cartridge stretching the skin ahead of the blades and desirably supporting or aligning hairs during the shaving process, while the cap 17 is generally known to be a low friction element located at the back of the cartridge allowing the skin to glide past the back of the cartridge while assisting in maintaining skin stretch. The cap may desirably also provide lubrication, smooth glide or other skin control.

Although four blades are shown in FIG. 1, it is understood that any number of blades, more or less, may be mounted within the cartridge 10. The housing 19 of conventional razors generally includes the frame 15 and the guard 16 and/or guard bar 16a. The blades 12a, 12b, 12d, and 12e and the non-cutting element 14 are shown secured within the housing 19 with the clips 18a and 18b. The non-cutting element 14 may be secured, mounted or otherwise coupled within the frame 15 of the housing 19 via mechanical (e.g., spring loaded, compression fit), thermal, chemical means, or other means known to those of skill in the art, but desirably in the same manner as conventional blades. Other assembly methods for the non-cutting element of the present invention will also be described in more detail below.

While for the present invention the non-cutting element 14 may advantageously be installed just as a regular or standard blade (e.g., blade with blade support or bent blade) would be installed having spring-loaded or not spring-loaded capabilities, most desirably the non-cutting element may be not spring-loaded or fixed.

Figure 2:
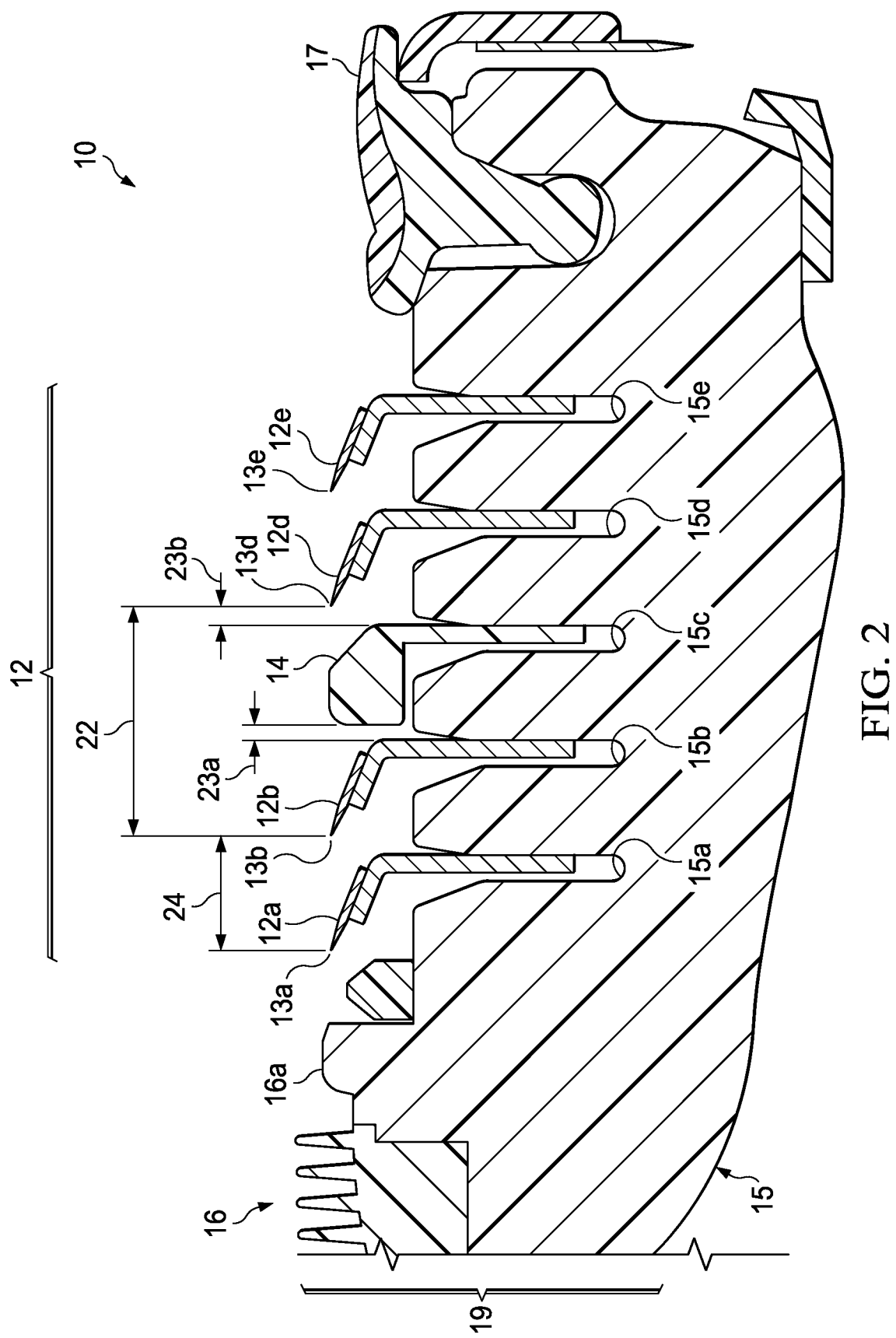
FIG. 2 is a cross-sectional view of the razor cartridge of FIG. 1.

FIG. 1 shows non-cutting element 14 positioned desirably midway through blade array 12 near or in the standard $3^{rd}$ blade position (or blade slot 15c as shown in FIG. 2) when viewed traveling in the width-wise direction of the cartridge 10 from the guard 16 toward the cap 17, basically taking the place of one of the blades and in effect, splitting the cartridge into two units, cartridge unit 10a and cartridge unit 10b, a cartridge unit in front of the non-cutting element 14 and a cartridge unit behind non-cutting element 14, respectively, where non-cutting element 14 may desirably be encompassed in both cartridge units 10a and 10b or in general, may be disposed anywhere between the cap 17 and the guard 16 in the cartridge 10.

Figure 4:
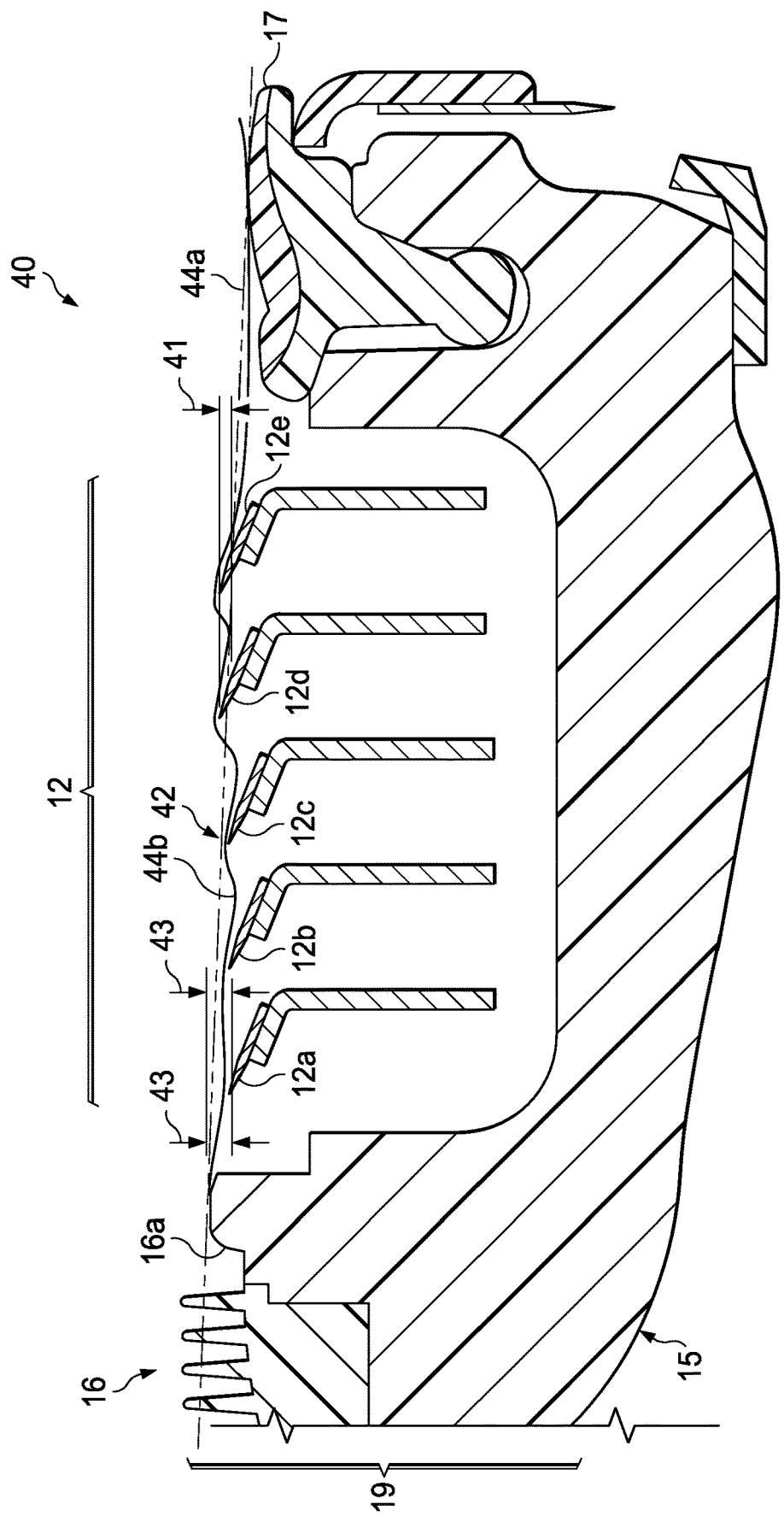
FIG. 4 is a cross-sectional view of a conventional razor cartridge and the respective blade exposures.
Figure 4A:
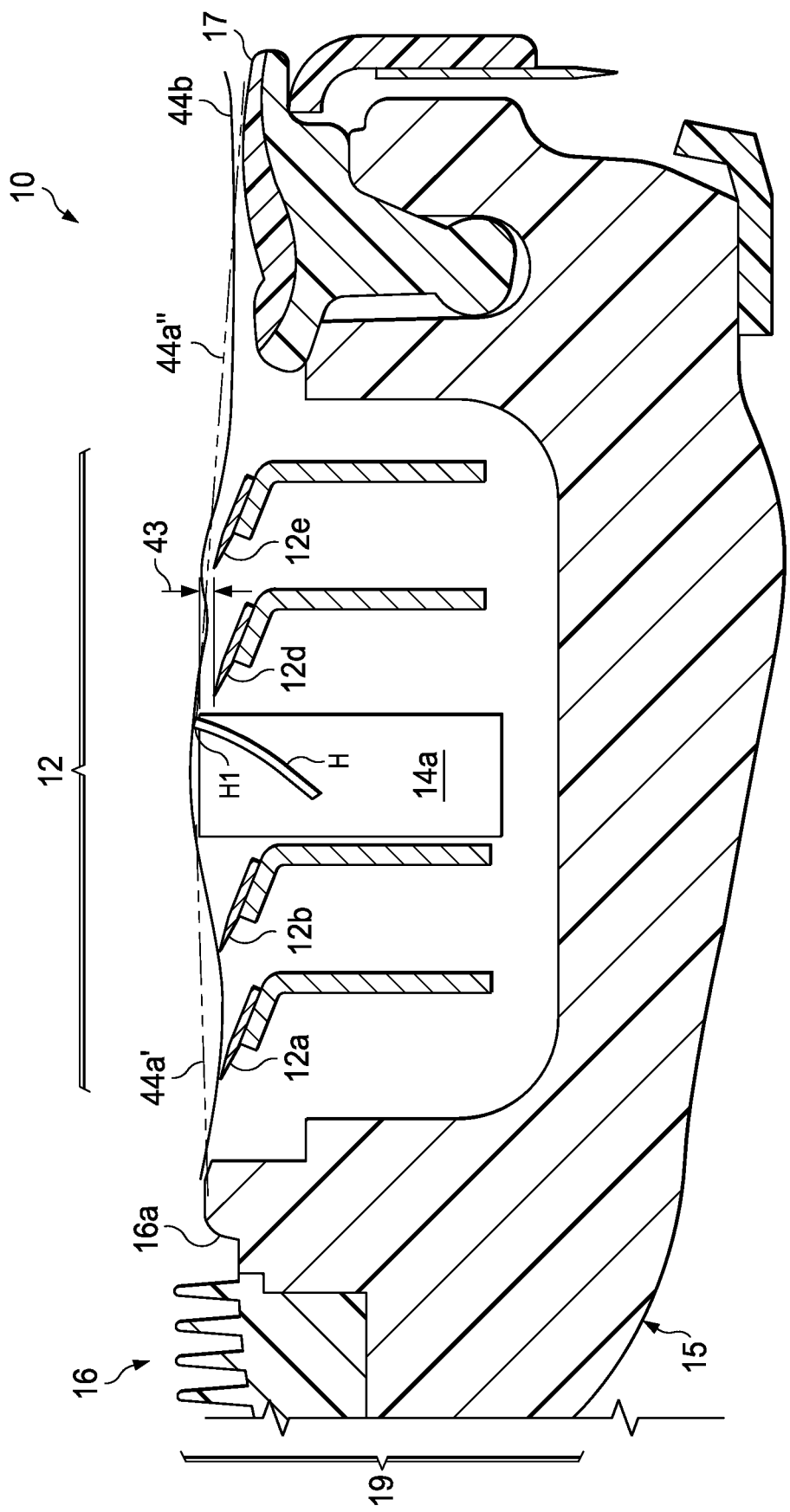
FIG. 4A is a cross-sectional view of a razor cartridge showing a non-cutting element therein and the respective blade exposures of the present invention.
Figure 4B:
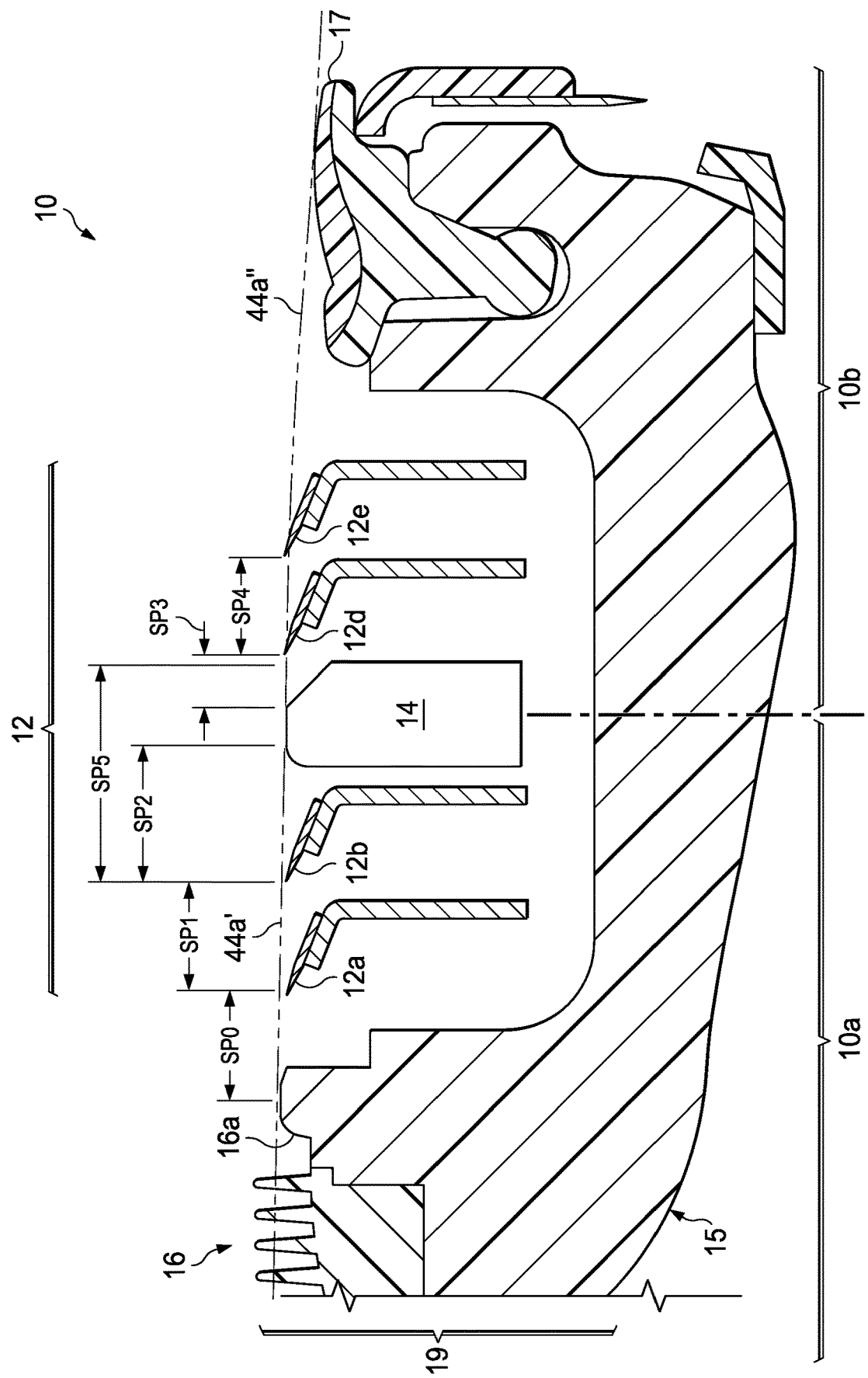
FIG. 4B is a cross-sectional side view of a razor cartridge showing a non-cutting element therein in accordance with an alternate embodiment of the present invention.

Such a "two-stage" or "multi-stage" cartridge may provide many shaving advantages, many of which are described in detail in conjunction with FIGS. 4A and 4B where FIG. 4B describes an alternate embodiment of a "two-stage" cartridge concept of the present invention.

FIG. 1A depicts the razor cartridge 10 of FIG. 1 operatively coupled to a handle 11 via interconnect member 11a to provide a functional razor 20. In the present invention, the razor may be entirely disposable or the razor may include a reusable handle with a disposable cartridge.

Referring now to FIG. 2, a cross-sectional side view of FIG. 1 is depicted where it can be seen that the non-cutting element may be disposed within slot 15c and may be centrally located in a blade array 12 (e.g., or a "mixed" blade array 12). Desirably, the non-cutting element 14 is a stand-alone or independent element and is not attached to another blade. In this embodiment, the non-cutting element 14 may be thought of as a mock-up or a "dummy" blade.

In FIG. 2, "rinse-through gaps" (e.g., a gap for cut hair and debris to flow into and generally representing the shortest distance between the blades or the blades and fixed points such as the guard or the cap) are provided both before and after the non-cutting element 14 as shown at first rinse-through gap 23a and second rinse-through gap 23b, respectively. The first rinse-through gap 23a may range from about 0.05 mm to about 0.5 mm and desirably about 0.1 mm to about 0.2 mm and the second rinse-through gap 23b may range from about 0.05 mm to about 0.6 mm and desirably about 0.2 mm to about 0.5 mm. Generally, standard razor blades cartridges have rinse-through gaps (e.g., effectively the shortest distance between blades) that are about 0.5 mm wide and have a primary blade span of about 0.65 mm (e.g., the distance from the guard 16 to the first blade 12a). With a non-cutting element 14 disposed in the cartridge 10, the rinse-through gap spacing may generally decrease particularly if the blades are spaced closer together.

Having a first rinse-through gap 23a disposed before the non-cutting element 14 allows any excess hair that is cut by the second blade 12b or other debris to flow into this gap 23a, avoiding clogging the blades further back in the cartridge. Furthermore, second rinse-through gap 23b, disposed after the non-cutting element 14 may provide an area for cut hairs to flow into (e.g., hairs that are cut by the third blade 12d directly behind the non-cutting element 14).

First rinse-through gap 23a and second rinse-through gap 23b may be the same width or one gap may be of a smaller width than the other. For instance, it may be desirably to design first rinse-through gap 23a with a smaller width than second rinse-through gap 23b since blade 12e may have more cut hairs and excess debris flowing in between non-cutting element 14 and blade 12e.

As shown in FIG. 2, the blade tip span 22 between cutting edge 13b of blade 12b and cutting edge 13d of blade 12d with element 14 disposed therebetween ranges from about 1.50 mm to about 2.50 mm and desirably about 2.10 mm. Thus, the span 22 may be almost double the length of a conventional blade tip span or an inter-blade span between adjacent blades having no non-cutting element 14 disposed therebetween, as shown for instance, at span 24 in FIG. 2 between cutting edge 13a of blade 12a and cutting edge 13b of blade 13b which may desirably be about 1.05 mm.

Figure 2A:
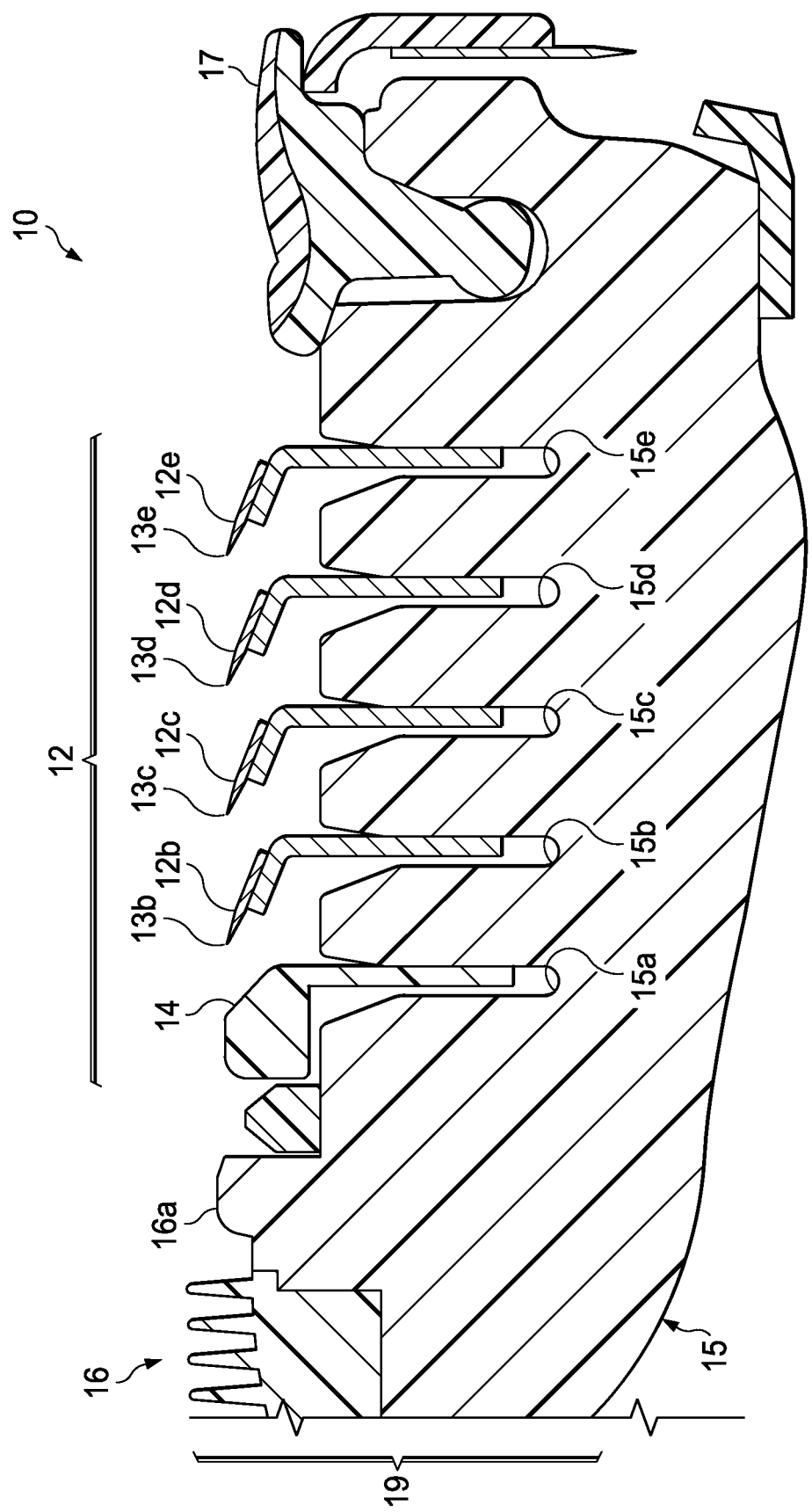
FIGS. 2A, 2B, 2C, and 2D are cross-sectional views of alternate embodiments of razor cartridges of the present invention.
Figure 2B:
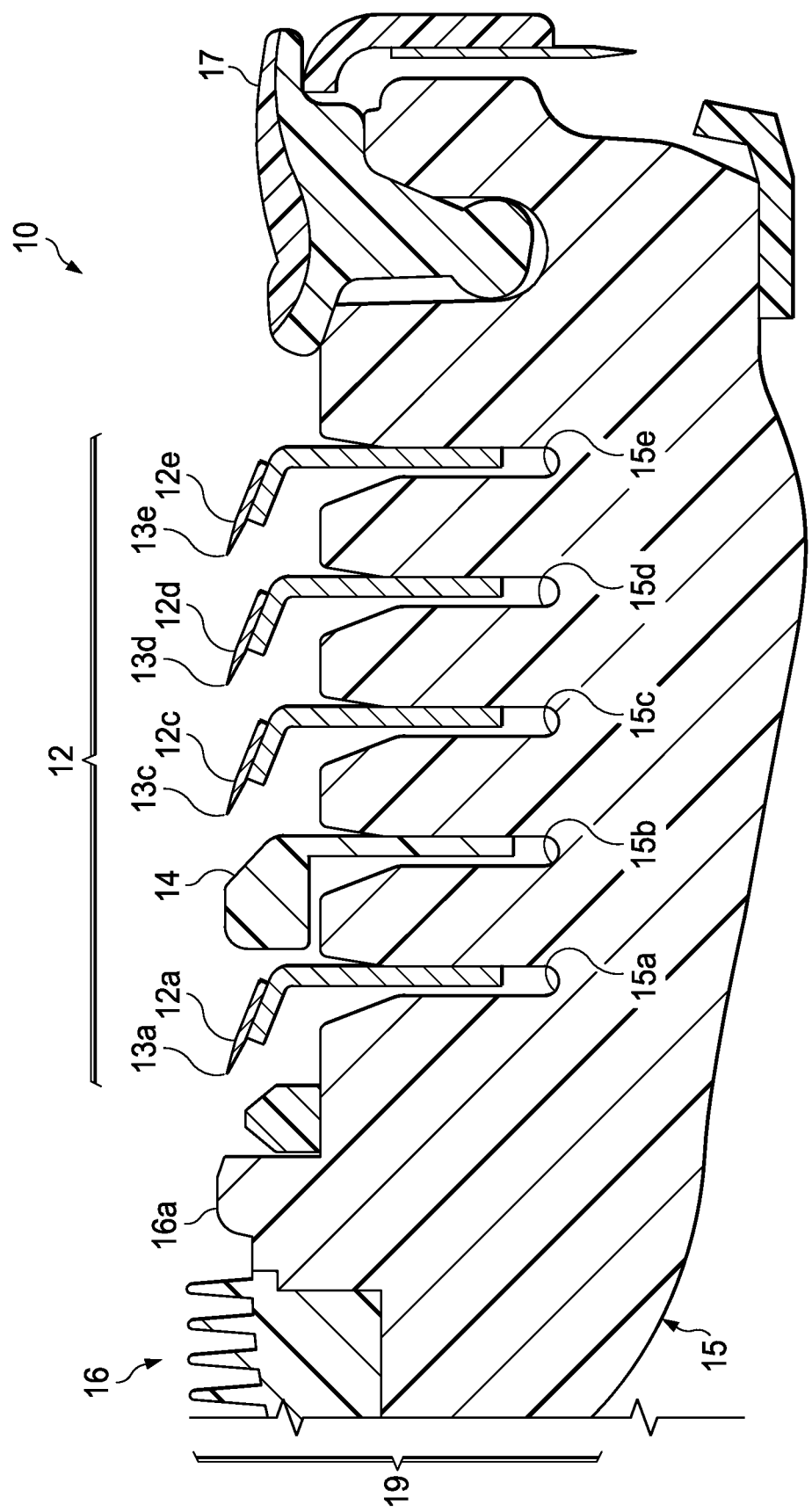
Figure 2C:
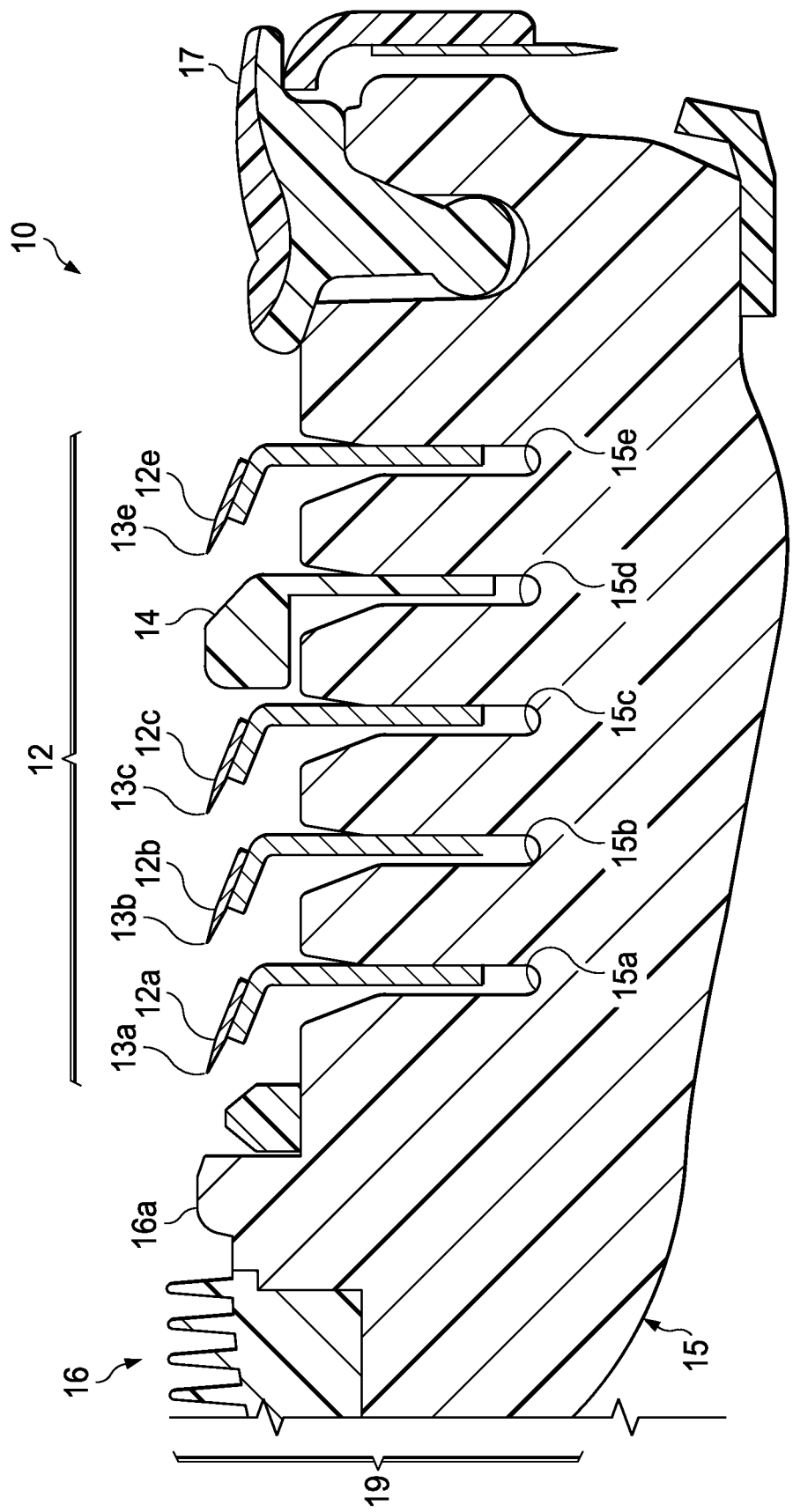
Figure 2D:
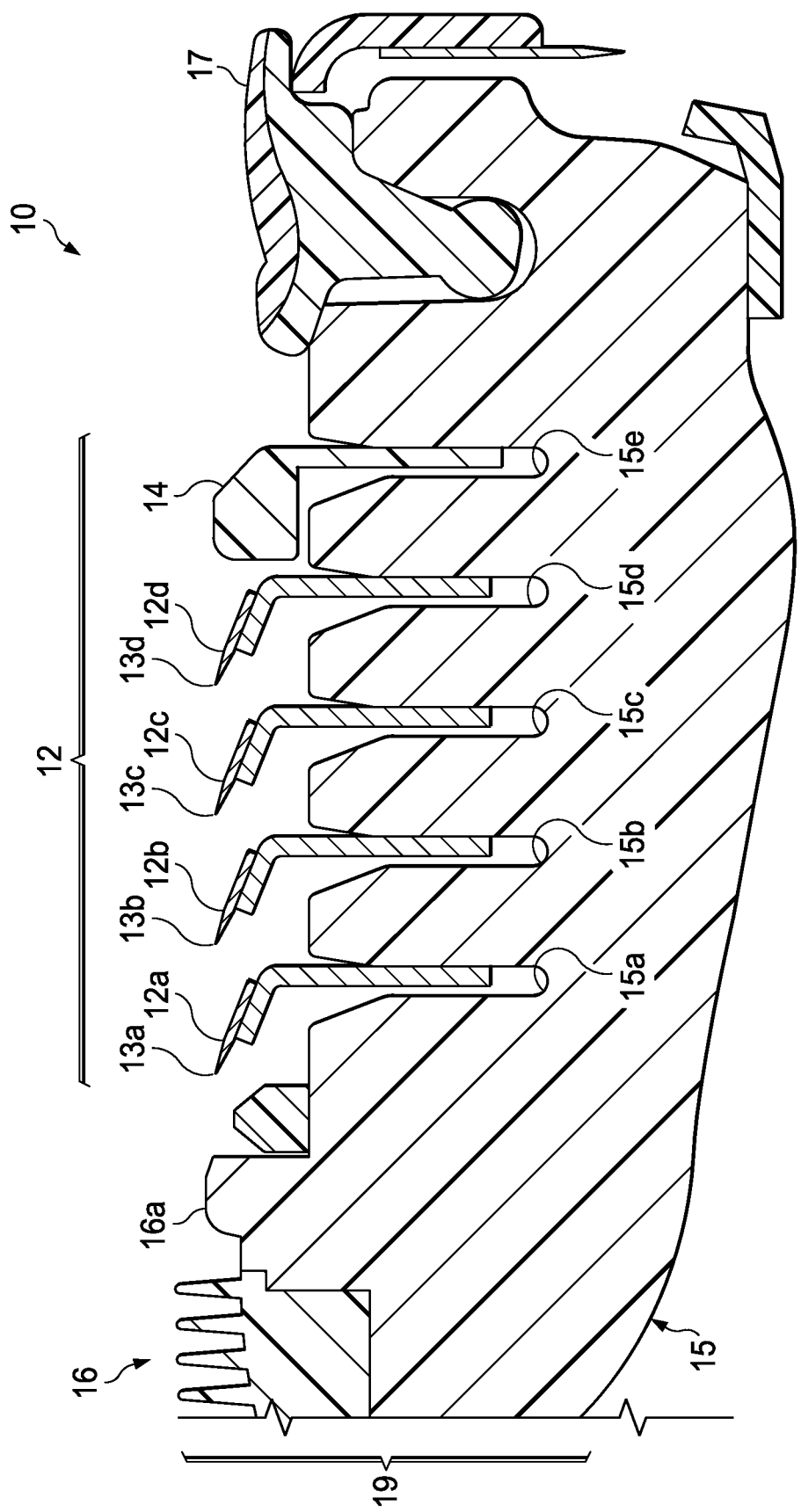

Though shown disposed in the $3^{rd}$ or middle blade position of a five-bladed razor cartridge 10 in FIG. 1, the non-cutting element 14 of the present invention may be disposed at, near or in any position or blade slot of a razor cartridge having any number of blades. In a five-bladed razor cartridge, the non-cutting element 14 may be disposed at, near, or in any of the $1^{st}$, $2^{nd}$, $3^{rd}$, $4^{th}$ or $5^{th}$ positions or blade slots of a razor cartridge typically utilized for five blades with the remaining blade slots having blades. Specifically referring to FIGS. 2A, 2B, 2C, and 2D, other possible locations of a non-cutting element 14 of the present invention are shown. For instance, the non-cutting element 14 may be disposed in the $1^{st}$ position or blade slot 15a as shown in FIG. 2A, and hence, adjacent to one blade 12b; in the $2^{nd}$ position at slot 15b as shown in FIG. 2B, and hence, in between two blades 12a and 12c, in the $4^{th}$ position or slot 15d in FIG. 2C in between two blades 12c and 12e, or in the $5^{th}$ position or slot 15e in FIG. 2D adjacent to one blade, blade 12d. The non-cutting element 14 is shown disposed in the $3^{rd}$ position or slot 15c as described above with regard to FIG. 1; thus, between two blades, blades 12b and 12d.

Figure 3A:
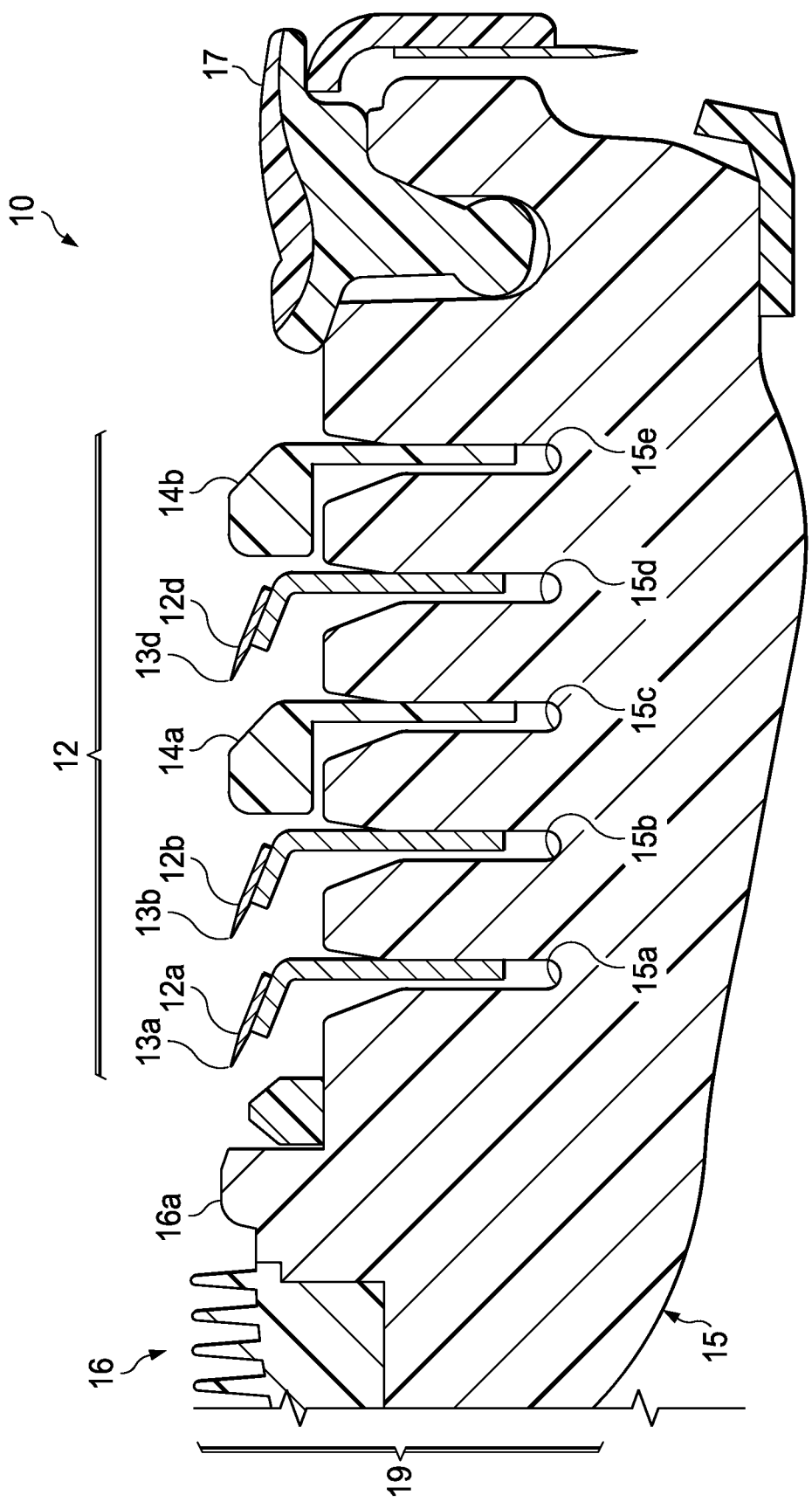
FIGS. 3A, 3B, 3C, and 3D are cross-sectional views of alternate embodiments of razor cartridges of the present invention.
Figure 3B:
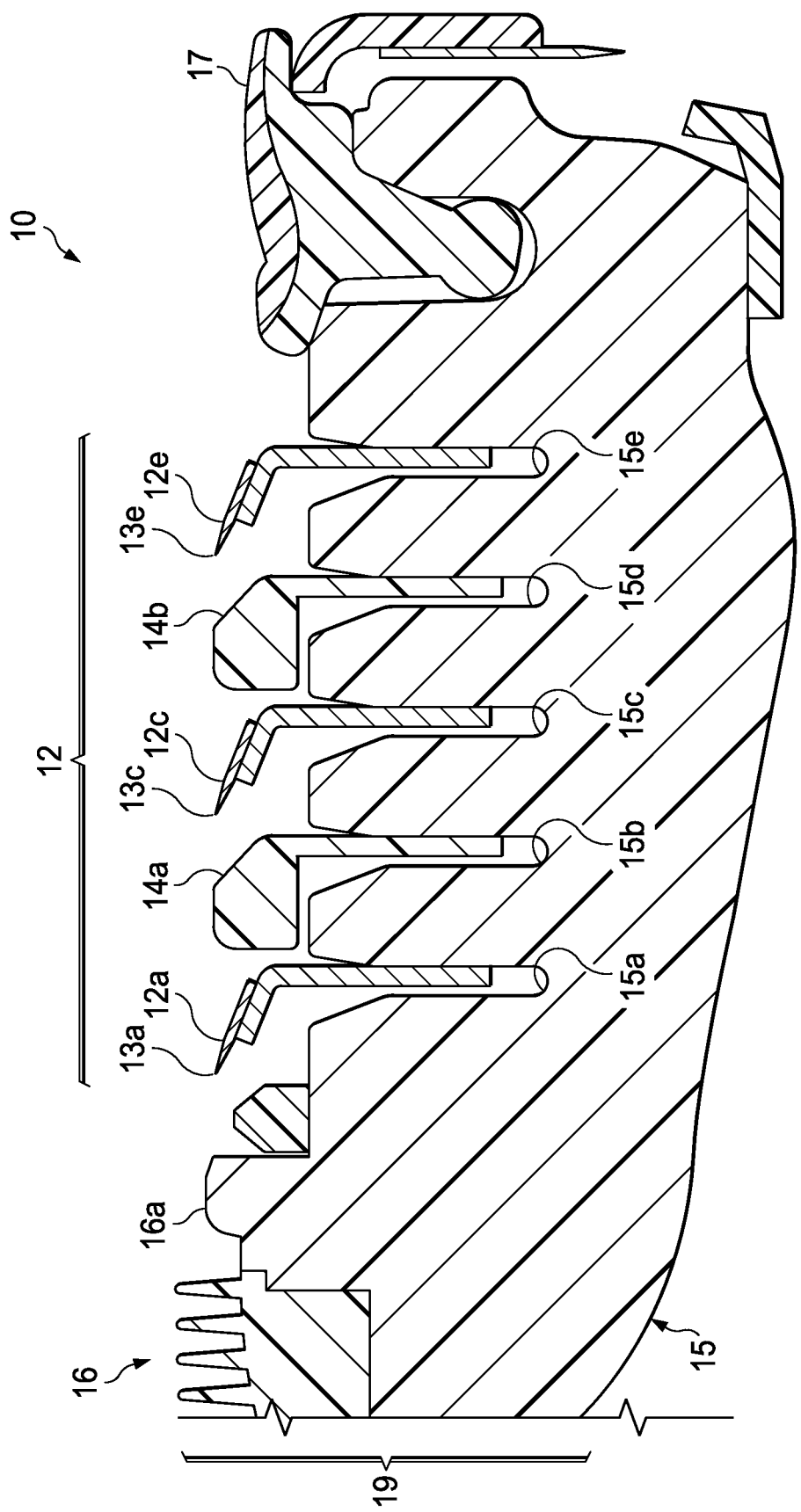
Figure 3C:
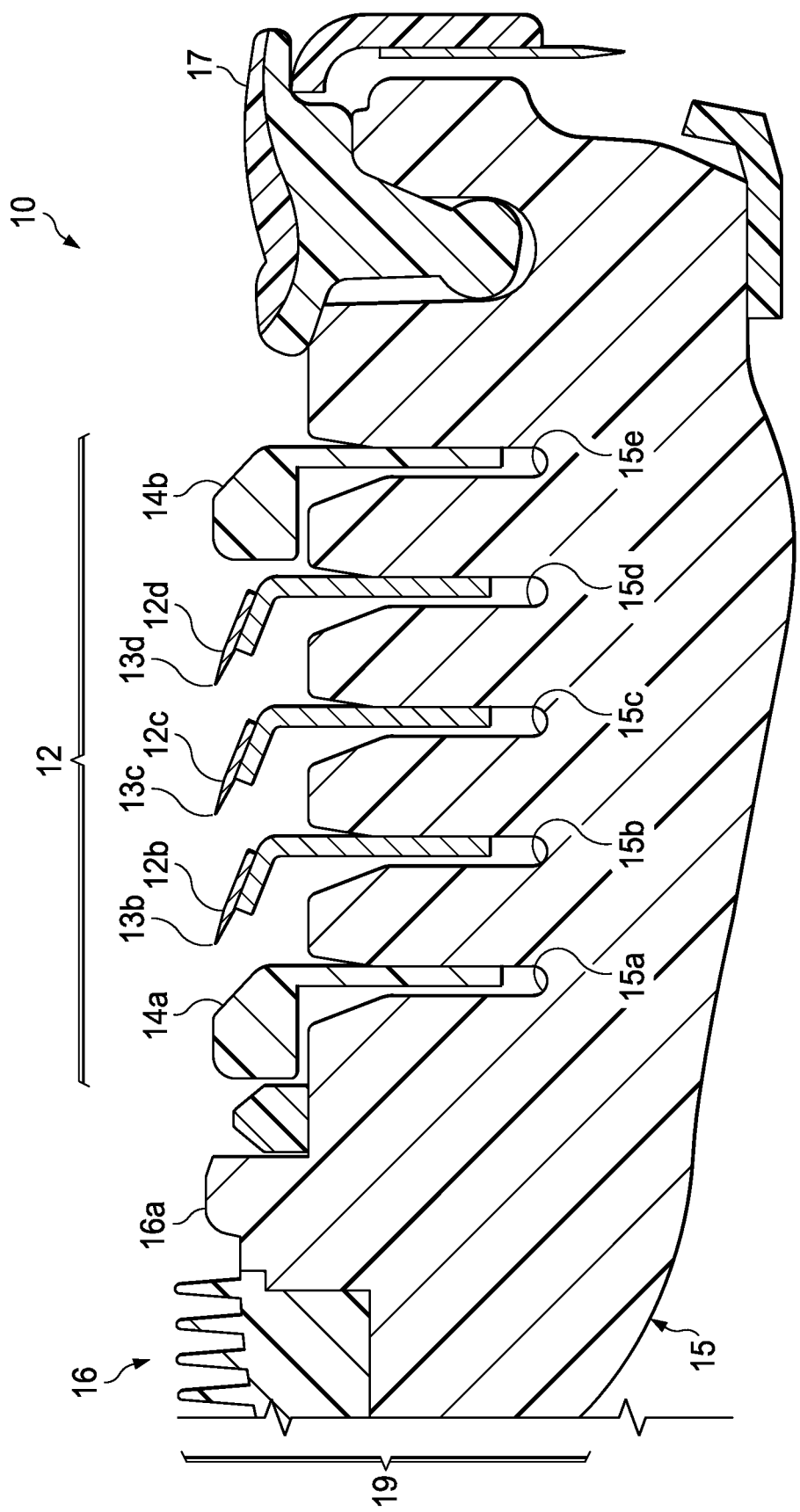
Figure 3D:
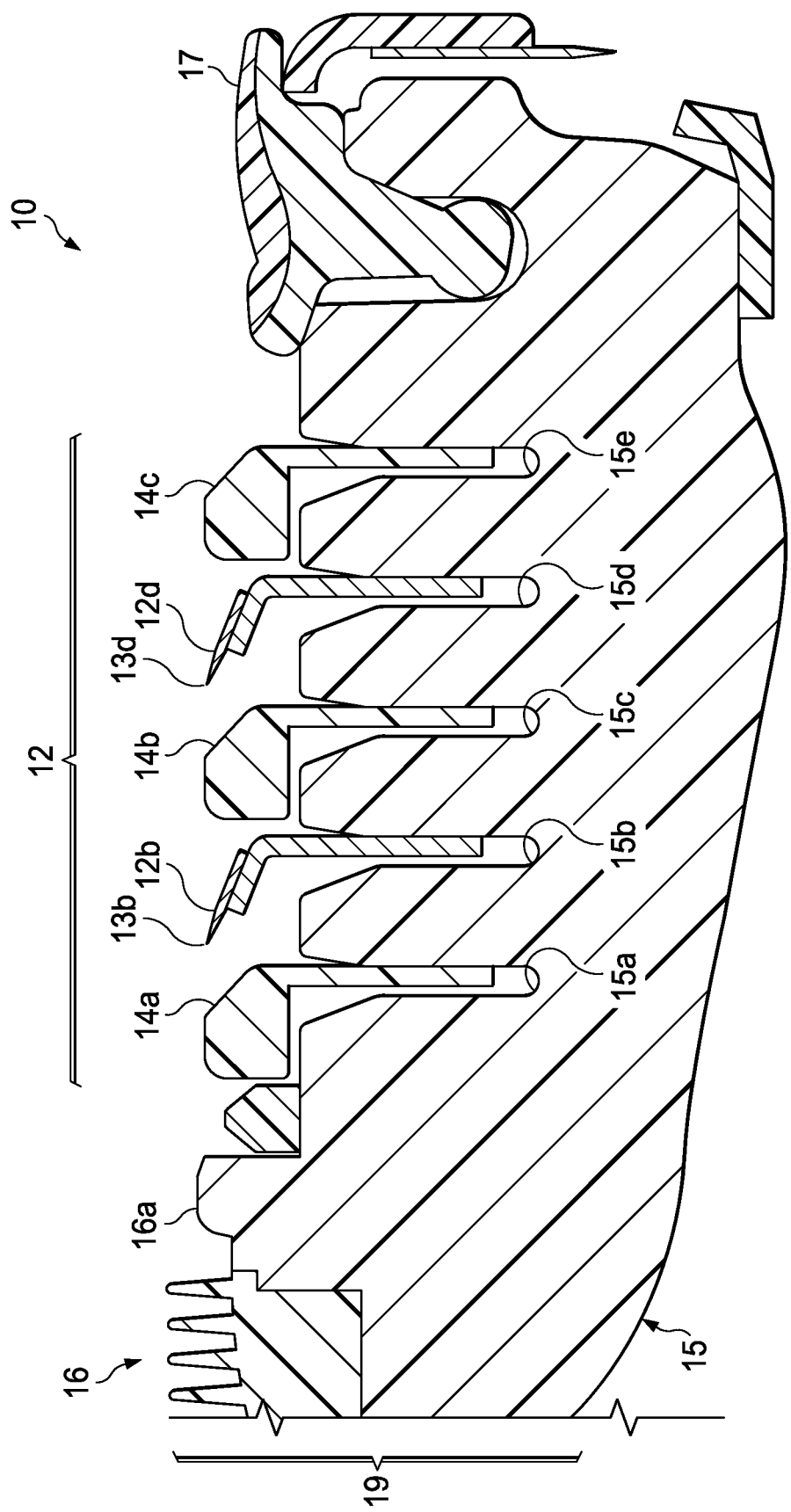

The present invention further contemplates having more than one non-cutting element 14 disposed in the blade array 12 of cartridge 10, as shown in the illustrative embodiments of FIGS. 3A, 3B, 3C, and 3D. For instance, in FIG. 3A, two non-cutting elements 14a and 14b are disposed in the $3^{rd}$ and $5^{th}$ positions (or blades slots 15c and 15e), respectively. The non-cutting elements 14a and 14b may be of any type but in this embodiment, the non-cutting element 14a may desirably be an elastomeric guard-like element while non-cutting element 14b may be an exfoliating element. In FIG. 3B, two non-cutting elements 14a and 14b are disposed in the 2nd and $4^{th}$ positions (or blades slots 15b and 15d), respectively. In this embodiment, non-cutting element 14a may desirably be an elastomeric guard-like element while non-cutting element 14b may be a lubricating strip element or provide enhanced shaving aid material to complement the capabilities of the cap 17. In FIG. 3C, two non-cutting elements 14a and 14b are disposed in the $1^{st}$ and $5^{th}$ positions (or blades slots 15a and 15e), respectively. In FIG. 3D, there are three non-cutting elements 14a, 14b, and 14c which are disposed in the $1^{st}$, $3^{rd}$, and $5^{th}$ positions (or blades slots 15a, 15c, and 15e), respectively.

Though three or more non-cutting elements may be disposed in the blade array, it may be deemed impractical to have too many non-cutting elements in the blade array as the accumulation of non-cutting elements may, on the whole, decrease the number of razor blades capable of being disposed in a blade array, unless the blade array were otherwise designed.

Generally however, with little to no change to the structure of cartridge 10 or its housing 19, where a housing generally includes a frame 15 and a guard 16, any desirable variation of types and numbers of blades and one or more non-cutting elements 14 may be provided in the present invention.

Referring now to FIGS. 4 and 4A, embodiments where a positive impact of having a non-cutting element disposed in a blade array will be described in more detail.

It is known that blade exposure may impact the skin loading on the blade, which in turn may affect shaving attributes such as comfort, safety and efficiency. Thus, referring now to FIG. 4, blade exposures of a traditional razor design 40 with multiple blades or a blade array 12 (e.g., without a non-cutting element disposed in the blade array 12) are shown as being defined by the positioning of the individual blades (12a-12e) relative to the guard 16 and/or guard bar 16a and the cap 17 where the guard/guard bar and the cap provide first and second control points for the skin, respectively. Thus, exposure may be determined by drawing a fairly straight line 44a (an imaginary or virtual skin line) through the cap 17 and guard 16 and noting where the blade edges 13a-13e (or blade tips) fall relative to that straight line 44a.

The blades as arranged together in FIG. 4 provide a progressive geometry as described in U.S. Pat. No. 6,212,777 entitled Safety Razors, and U.S. Pat. No. 6,216,349 entitled Safety Razors issued on Apr. 10, 2001 and Apr. 17, 2001, respectively, and both assigned to the Assignee hereof. Consequently, as it is known in the art, based on the assumption that the skin may generally lie flat or in a fairly straight line between the guard bar 16a and cap 17 as depicted by virtual skin line 44a, this blade positioning may be used to produce a negative blade exposure 43 at blade 12a since blade 12a is below the level of the guard bar 16a, a neutral blade exposure 42 at blade 12c since blade 12c is at the same level or plane as the guard bar 16a or the cap 17, and a positive blade exposure 41 as shown at blade 12e since the tip of the blade 12e is above the cap 17. Additionally, blade 12b may have a negative exposure and blade 12d a positive exposure as depicted vis-à-vis the virtual skin line 44a.

The negative exposure 43 for blades 12a and 12b may desirably be in the range from about −0.18 mm to about −0.01 mm and more desirably about −0.07 mm while the positive exposure 41 for blades 12d and 12e may desirably be in the range from about 0.18 mm to about 0.48 mm, and more desirably about 0.33 mm.

In general, having some positive and some negative exposures in the blade array may be beneficially desirable since blades with some negative exposure may be better at protecting the skin while optimally cutting the hair and blades with some positive exposure may be better at releasing trapped hairs. However, it may also be desirable to have neutral or zero exposures throughout the array such that the skin just skims the surface, substantially minimizing the contact with the blades and therefore, improving shaving attributes such as comfort and safety.

The exposures in FIG. 4 may be desirable but they are designed theoretically as they are based on the assumption that the skin generally lies in a relatively straight line between the guard 16/guard bar 16a and the cap 17 as depicted by virtual skin line 44a. In reality of course, skin is soft and flexible and an actual skin flow line 44b flows over the blades and may conform or sit along the upper surfaces of the blade tips or edges at the various positions of the blades and thus, as shown in FIG. 4, may likely not match the straight virtual skin flow line 44a.

As can be seen, a positively exposed blade, such as blade 12e from FIG. 4, may generally push the skin line 44b up and away from the virtual line 44a producing more blade tip loading while a negatively exposed blade, such as blade 12a from FIG. 4, may generally rely on the skin line 44b to bulge into the cartridge and to come into contact with blade 12a itself, rather than blade 12a pushing up into the skin or skin line 44a. This illustration demonstrates that it may likely be easier to control the skin (and hence, also the hair) flow near the guard/guard bar and near the cap which represent fixed (or control) points over which the skin flows. Guided by these concepts in general, it may be seen that this geometric control may thus become less precise the further away a blade is from either the cap 17 or guard 16/guard bar 16a.

Thus, in many instances, midway through a cartridge 10 or near the center of a blade array 12 may be an area where there may be a loss of defined skin/hair control.

While conventional razors aptly control skin and hair flow across an entire razor cartridge or blade array, the addition of one or more non-cutting elements within the blade array 12 (desirably centrally located) advantageously inserts at least one more control point for skin, thereby allowing greater control over the geometry for individual or small groups of blades, fine tuning skin bulged, exposure and also blade tip loading for much improved comfort and cutting of hair (e.g., in closeness and number) and hence, shaving performance, as will be described below.

It should be noted that in the above-described embodiments of FIGS. 3A, 3B, and 3C, where two non-cutting elements 14a and 14b are inserted into the blade array, two supplementary control points are provided via those non-cutting elements in addition to the guard 16 and cap 17 control points. Referring back to FIG. 3C, one control point may be provided before the first blade 12b with non-cutting element 14a and one control point may be provided after the third blade 12d with non-cutting element 14b. Further, depending on the type and extent of capabilities of the non-cutting elements 14a and 14b, the present invention may theoretically contemplate an embodiment of a razor cartridge having minimized or possibly non-existent guard 16 or cap 17 structures (not shown).

Referring now to FIG. 4A, the addition of at least one non-cutting element 14 generally in the middle of the blade array 12 of FIG. 4, effectively provides a central or third control point (in addition to the first and second guard and cap control points, respectively) thereby imparting a desired or greater manipulation of the skin loading of a single or group of blades. With a third control point, there may effectively be two skin lines. For instance in FIG. 4A, referring to virtual skin lines, there may be a virtual skin flow line 44a' from guard bar 16a to non-cutting element 14 and a virtual skin flow line 44a" from non-cutting element 14 to cap 17.

The non-cutting element 14 may lie on the same plane as the blades 12a, 12b, 12d, and 12e of the blade array 12 or on a different plane or any combination thereof. The non-cutting element 14 may also lie on the same plane as blades 12b and 12d, but on a different plane from the plane of blades 12a or 12e. The latter arrangement would provide a neutral exposure for blades 12b and 12d relative to the non-cutting element 14 and may lower the blade tip loading on the skin near the area of the non-cutting element as those blades may just skim the skin. The non-cutting element may also, as mentioned above, be disposed anywhere between the cap 17 and the guard 16 in the cartridge 10.

It may be also desirable to adjust the blades' exposures such that blade 12d is set at a negative exposure relative to the non-cutting element 14. For example, as can be seen in FIG. 4A, the exposures of the blades 12a, 12b, 12d, and 12e of the blade array 12 are arranged similarly to that of FIG. 4, relative to each other, but the presence of the non-cutting element 14 in between blades 12b and 12d and its being disposed slightly higher than one or both of blades 12b or 12d provides not only a fixed control point but a negative exposure for those lower blades. Thus, just after the blade 12b, the non-cutting element will force the actual skin line 44b up to its upper surface 14a as shown in FIG. 4A and desirably may prevent hair H from being pushed down and/or may also lift or boost up the hair H at the same time the skin is forced up. For illustrative purposes, only one hair H is shown in FIG. 4A. The negative exposure of the blade 12*d* relative to non-cutting element 14 which may desirably be up to about −0.3 mm may, as the shave stroke passes the non-cutting element 14 and contacts blade 12*d* behind it, desirably minimize blade 12*d*'s contact with the skin 44*b*, or effectively mask the skin, allowing contact of blade 12*d* to be substantially with just hair H. This in turn, desirably allows the hair H to also be cut at a point H1 closer to the skin such that more of the length of each hair will be cut, improving the extent to which missed hairs are cut and also increasing the number of missed hairs that are cut and therefore, upgrading the perception of the shave outcome by the user (e.g., the skin will feel smoother right after shaving).

With the presence of a non-cutting element in the blade array, all the blades may desirably be substantially prevented from coming into contact with the skin (e.g., improved comfort, glide and safety), but the boosting of the height of the hair provides expanded blade contact with the hair combined with the blades' minimal to no contact with the skin (e.g., in particular at the blade 12*d* behind the non-cutting element 14 as described above) improves the cutting of the hair.

However, were the non-cutting element 14 of FIG. 4A disposed such that there was a neutral or zero blade exposure relative to each of the blades in the blade array 12 (e.g., so that the blades and non-cutting element just skim the skin), attributes such as shaving comfort, glide and safety are also improved during the shave. Furthermore, theoretically, were each blade to be located behind a non-cutting element as shown for instance, in FIG. 3D of the present invention, and if arranged with neutral or negative exposures, the skin may substantially not come into contact with the blade tips or blade edge, leaving the blade again substantially in contact with the hair to be cut. This may ostensibly lead to a very comfortable shave and more desirably, nick-less skin. Such improved skin flow may also bear positively with regard to shaving closeness.

In addition to skin flow improvements and increased hair contact, if the non-cutting element were to also include hair feeding or hair aligning structures (e.g., projections shown and described below in conjunction with FIGS. 5B and 5D), hair control/flow may be further enhanced and shaving efficiency may desirably be improved.

Thus, as a result, by having one or more non-cutting elements within the blade array 12 generally both skin and hair may be desirably managed. Though not shown, the present invention also contemplates an arrangement where two non-cutting elements may be disposed in the middle of the blade array 12, either by being placed in adjacent positions (e.g., blade positions) or by being attached to each other and placed in the same blade position.

Furthermore, having one or more non-cutting elements disposed in the blade array may advantageously allow even sharper blades (e.g., with low cutting forces) or other blade arrangements to be utilized, without which, in a conventional razor may be too sharp (e.g., dangerous risk of cutting) or uncomfortable for users. For example, a very sharp type blade may desirably be disposed in the blade position directly behind such a non-cutting element (e.g., blade 12*d*).

Referring now to FIG. 4B, an alternate embodiment of a "two-stage" cartridge of the present invention is shown.

As noted above, the guard area 16 of a razor cartridge 10 is known to produce higher friction at the front of the cartridge which stretches the skin ahead of a blade and desirably aligns hairs during shaving, while the cap 17 is generally known to be a low friction element for skin to glide over desirably additionally providing lubrication, smooth glide or other skin control.

The front of the cartridge unit 10*a*, which may be thought of as a "first stage" may include, as shown in FIG. 4B, a guard 16 and guard bar 16*a*, two blades 12*a* and 12*b* and a portion or the entirety of the non-cutting element 14, much like a traditional razor where the non-cutting element 14 in this instance may provide the "cap" functionality for the first stage, such as skin management or lubrication.

Cartridge unit 10*a*, located towards the front of the cartridge 10, contacts a user's hair and skin first and thus, may be designed to shave the bulk of a user's hairs or to be capable of removing longer hairs (e.g., as when people skip shaving every day). This capability may be improved, if, as described in pending US patent application, entitled Shaving Razors And Cartridges, Ser. No. 12/542,141, filed on Aug. 17, 2009, and assigned to the Assignee hereof, a guard bar 16*a* is formed with protrusions transverse to the blade cutting edges thereby providing enhanced synergy between the guard and the blades and improving hair flow and skin management.

In "second stage" of the cartridge or cartridge unit 10*b*, the non-cutting element 14 and two blades 12*d* and 12*e* and cap 17 where blades 12*d* and 12*e* are positioned in the back of the cartridge and in front of the cap 17. At least a portion of the non-cutting element 14 in second stage may desirably act as a conventional guard would or have guard-like capabilities, such as improved skin management as mentioned above. This cartridge unit 10*b* may target the missed or problem hairs from the "first stage" or unit 10*a*.

This multi-stage cartridge may provide two opportunities for all hairs to be cut, one in each stage. It in turn provides two opportunities for difficult hairs to be cut, thus improving the likelihood of difficult hairs actually being cut (e.g., not missed) or cut more (e.g., at or close to the skin line) with each shave.

Because the first stage as described above may have desirably removed the bulk of the hairs, the rinsing capabilities of cartridge unit 10*b* may not be as much of a concern in the second stage as it may be in the first stage, thereby allowing narrower spans in the second stage than those in the first stage without concerns of clogging or rinse-ability. In FIG. 4B, these spans may include spans such as span SP3 between non-cutting element 14 and blade 12*d* and span SP4 between blade 12*d* and blade 12*e* in the second stage. Generally, it is known that blades with a narrower span may improve shaving performance. Thus, as shown in FIG. 4B, the third and fourth blades 12*d* and 12*e* in cartridge unit 10*b* may have a narrower blade span SP4 than the span SP1 between blades 12*a* and 12*b* of cartridge unit 10*a*.

In a conventional razor cartridge (without a non-cutting element), there is generally only one primary blade span, a span located between a fixed control point (e.g., guard bar 16*a* or guard 16) and the first blade 12*a*. Primary blade spans provide the ability to aptly control the geometry having a nearby fixed control point (e.g., the guard/guard bar).

FIG. 4B contemplates having two primary spans. For instance, there may be a first stage primary span SP0, located between a fixed control point (e.g., guard bar 16*a* or guard 16) and the first blade 12*a* and span SP3 of the second stage or cartridge unit 10*b* which may be thought of as a second stage primary span since it is located between a fixed control point (e.g., the non-cutting element 14) and blade 12*d* much like the first stage primary span SP0 located between a fixed control point (e.g., guard bar 16*a* or guard 16) and the first blade.

In general, the smaller the spans (e.g., primary spans and blade tip to tip spans) throughout the cartridge, the less the skin bulges into the cartridge and the less nicking and discomfort realized. In the present invention, first stage primary span SP0 may range from about 0.01 mm to about 1 mm, blade tip span SP1 may range from about 0.5 mm to about 1.5 mm, secondary span SP2 may range from about 0.5 mm to about 2.0 mm, second stage primary span SP3 may range from about 0.01 mm to about 1 mm, blade tip span SP4 may range from about 0.5 mm to about 2 mm, blade tip span SP5 may range from about 1.5 mm to about 2.5 mm or desirably about 2.10 mm.

It should also be noted that the dimensions for rinse-through gaps before and after non-cutting element 14 in FIG. 4B, though not shown, may be similar to those of first and second rinse-through gaps 23a and 23b of FIG. 2.

Figure 4C:
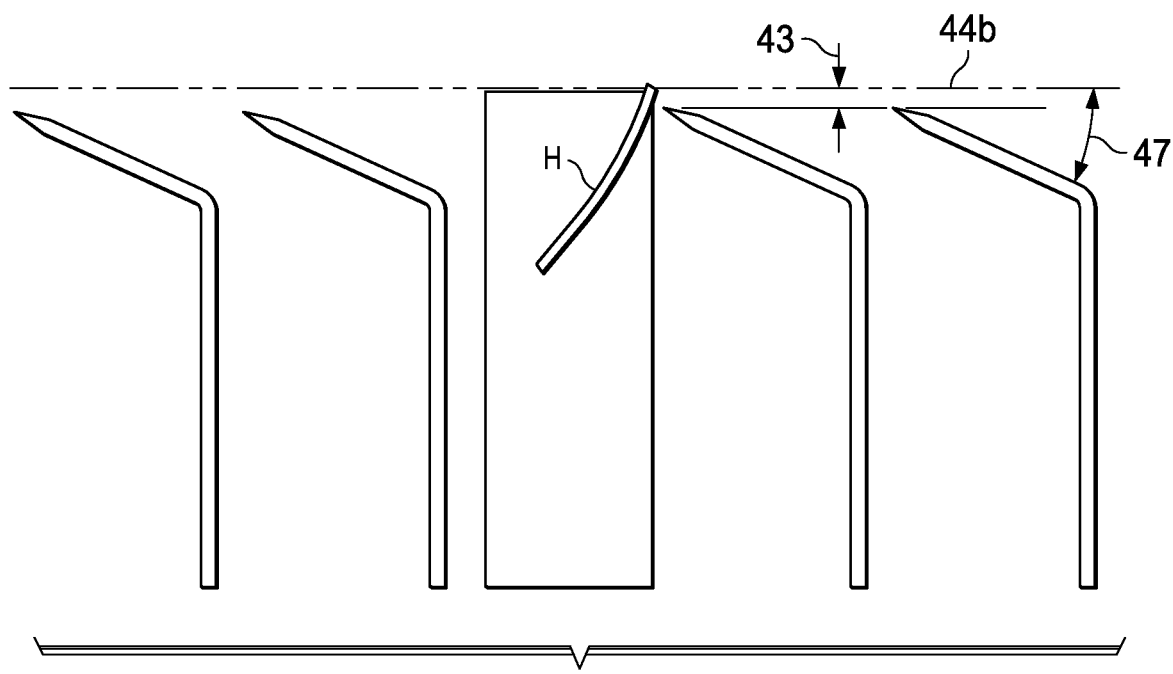
FIG. 4C is a side view of a razor cartridge of the present invention showing a non-cutting element therein and the respective blade tangent angles.
Figure 4D:
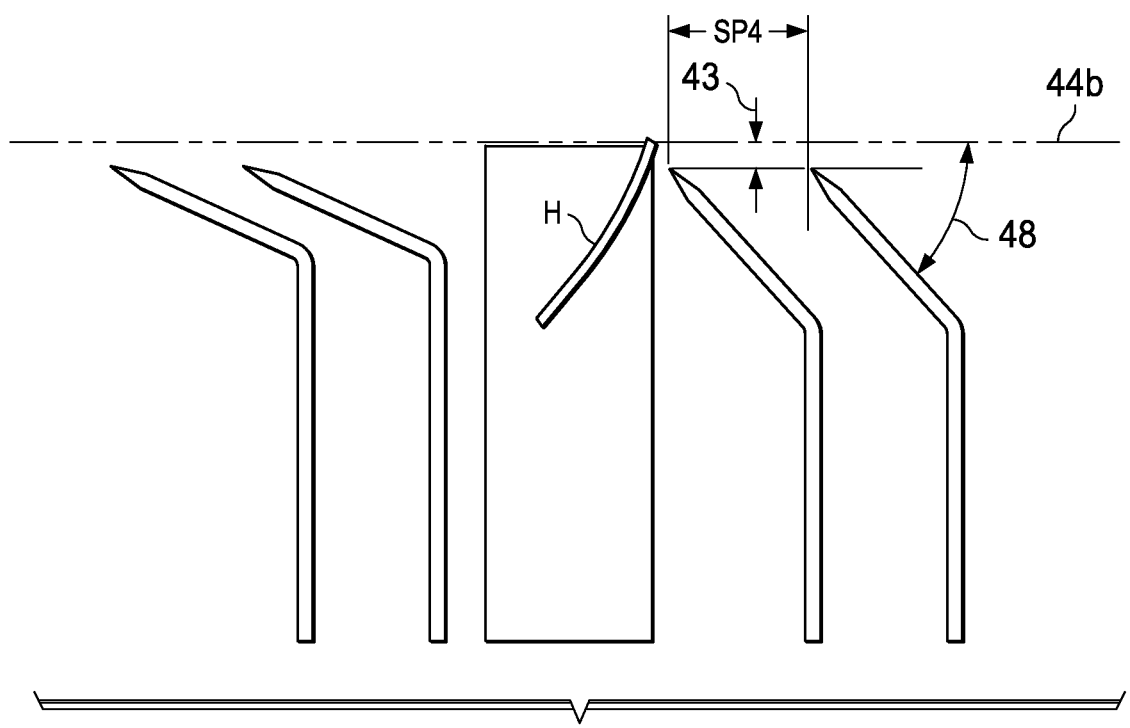
FIG. 4D is a side view of a razor cartridge showing a non-cutting element therein and the respective blade tangent angles in accordance with an alternate embodiment of the present invention.

With the knowledge that the blade may substantially not contact the skin, or just skim the skin as shown in FIG. 4A or FIG. 4B, having neutral or negative exposure for instance, the second stage or cartridge unit 10b of the present invention may also be modified to include even sharper blades and/or blades with a higher "blade tangent angle" (BTA) than conventional blade arrays, the latter shown in FIG. 4D.

Referring particularly to the BTA, it is generally known to signify the angle between the blade and the skin line. Increasing this angle may also allow the second stage to catch hairs that a more conventional first stage or cartridge unit 10a may have missed. However, adjustments to the BTA require some forethought in design as it is generally known that a higher BTA may improve closeness (e.g., more hairs cut), but typically at the expense of comfort (e.g., blades may drag on skin and damage it) whereas in contrast, a lower BTA may improve comfort, but typically at the expense of closeness.

With regard to BTAs, FIGS. 4C and 4D illustrate two arrangements of the present invention. In FIG. 4C, the blade tangent angle 47 may range from about 20 to 24 degrees from the skin line 44b and may desirably be about 22.5 degrees. FIG. 4C may be representative of a BTA that may be found in the arrangement of FIG. 4A.

In FIG. 4D, the BTA 48 may range from about 25 to 30 degrees from the skin line 44b and may desirably be about 28 degrees. In addition, FIG. 4D is shown with narrow spans, similar to the spans of FIG. 4B. The narrow span and the increase in BTA shown in FIG. 4D compared to FIG. 4C, along with the negative exposure 43 of at least blade 12d, may desirably provide an improved blade tip loading on the skin and improve the numbers of hairs that are cut without skin damage.

Such a multi-stage cartridge may advantageously provide a novel application of the non-cutting element of the present invention. For instance, a multi-stage cartridge may be choicefully designed to have different functionality before and after a centrally located non-cutting element and hence, target different types of hair and/or different hair areas (e.g., neck, chin, face, body). For instance, the cutting of difficult, low lying hair may be improved with the arrangement of FIG. 4D.

Thus, in arranging a multi-stage cartridge with the non-cutting element(s) of the present invention providing a generally central control point, a balancing of the several inter-related variables such as blade types, angles, spans, exposures, and number of blades relative to control points such as the non-cutting element, guard and cap, may generally be important for providing optimal designs that will not damage the skin while also effectively cutting the hair.

The presence of the non-cutting element or control point of the present invention makes available a wider range of possibilities for the fine-tuning of these inter-related variables than permitted in conventional razor cartridges and thereby may provide more advantages.

As mentioned above, desirably blade sharpness and angles may be increased, spans may be decreased and exposures may be neutral or negative to provide undamaged skin and to cut more hair (both in extent and number). Furthermore, the non-cutting element shall desirably allow skin and hair to pass without generating high friction thus maintaining the non-cutting element as a substantially low friction element within the blade array.

It should be noted however that any arrangement of type, angle, span, exposure, and number of blades in a multi-stage cartridge (e.g., cartridge units 10a and 10b) and any type of non-cutting element are contemplated in the present invention.

With regard to the design of the non-cutting element itself, since in a "two-stage" cartridge the non-cutting element 14 may act as both a cap for the first stage and a guard for the second stage, the non-cutting element 14 of such a multi-stage cartridge may be bifurcated length-wise portions (e.g., travelling in the direction from one clip to the other). The non-cutting element may include a lubricating strip along its length on the side of cartridge unit 10a and/or protrusions or other guard-like elements on the adjacent length for the cartridge unit 10b side as described in more detail below with regard to FIG. 5E. The lubricating strip portion may assist in providing cap functionality, e.g., lubrication, smooth glide or other skin control for unit 10a, while the protrusions may assist in providing guard functionality, generally serving to align hairs and support them during the cutting or shaving process for unit 10b.

Figure 5A:
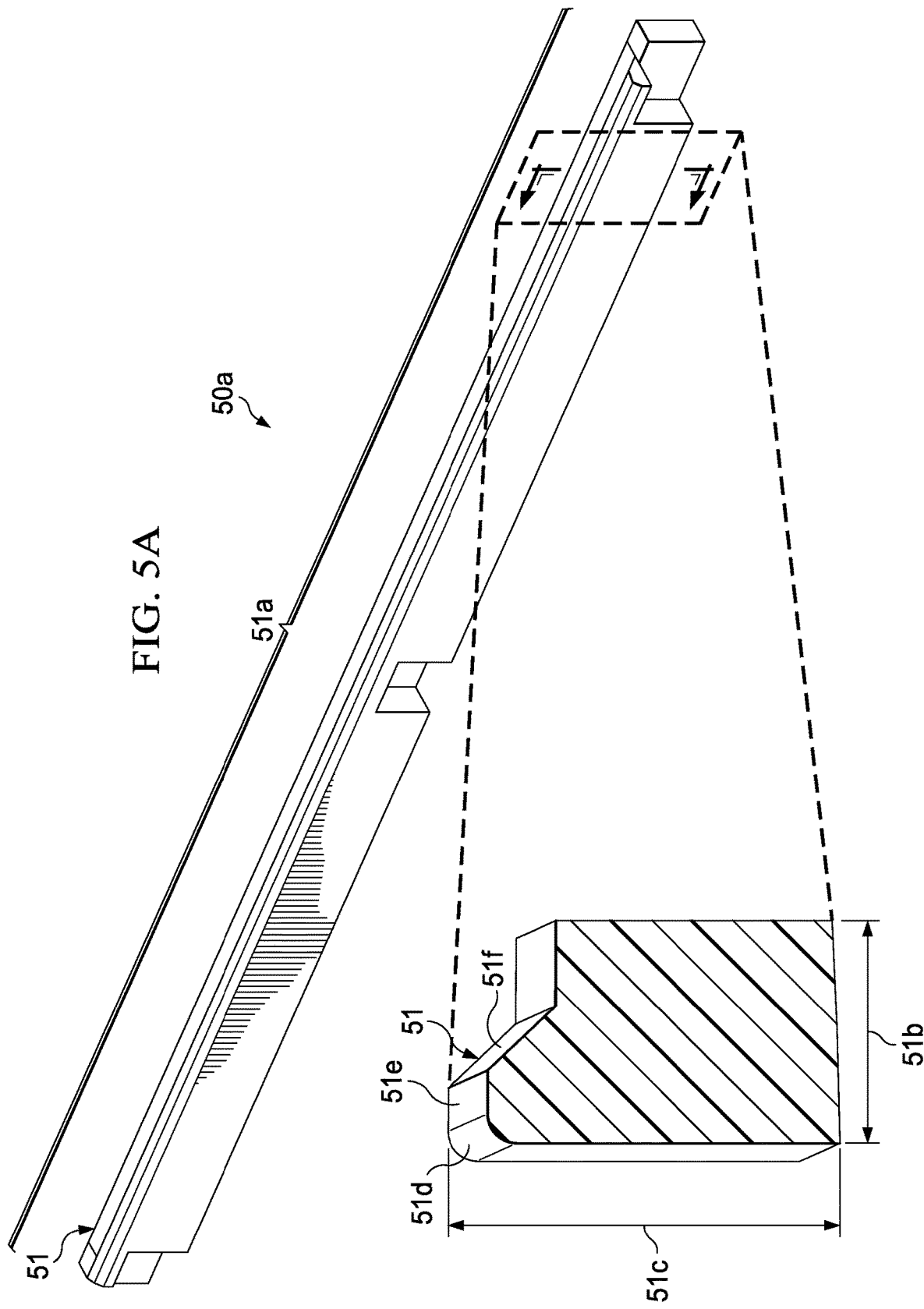
FIGS. 5A through 5N are perspective views of possible embodiments of non-cutting elements in accordance with the present invention.
Figure 5B:
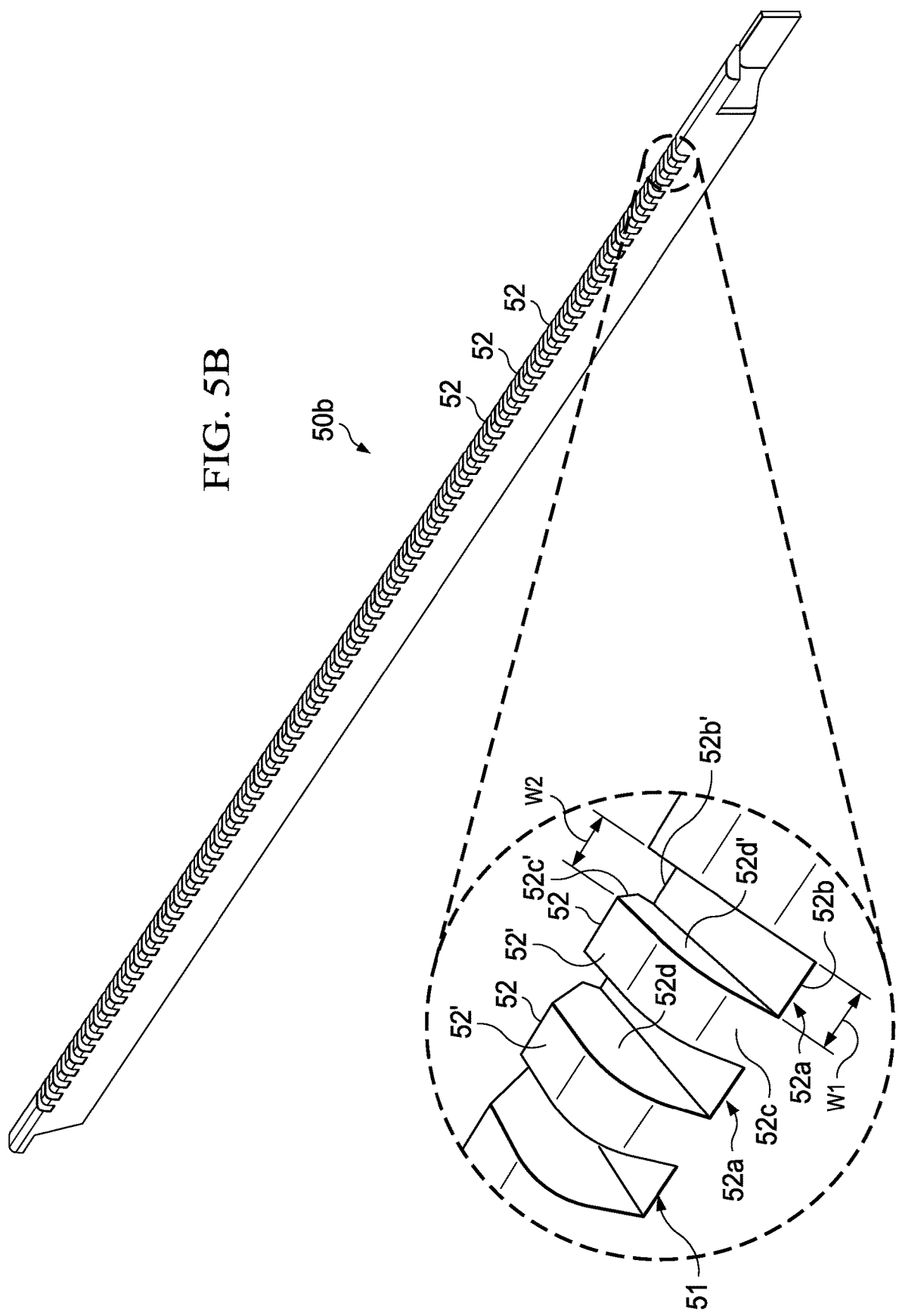
FIG. 5O is a top view of a plurality of teeth in a non-cutting element in accordance with the present invention.
FIG. 5P is a perspective view of FIG. 5O.
FIG. 5Q are top views of possible embodiments of non-cutting elements with teeth in accordance with the present invention.
FIG. 5R is a cross-sectional view of various non-cutting elements in contact with skin in accordance with the present invention.
Figure 5C:
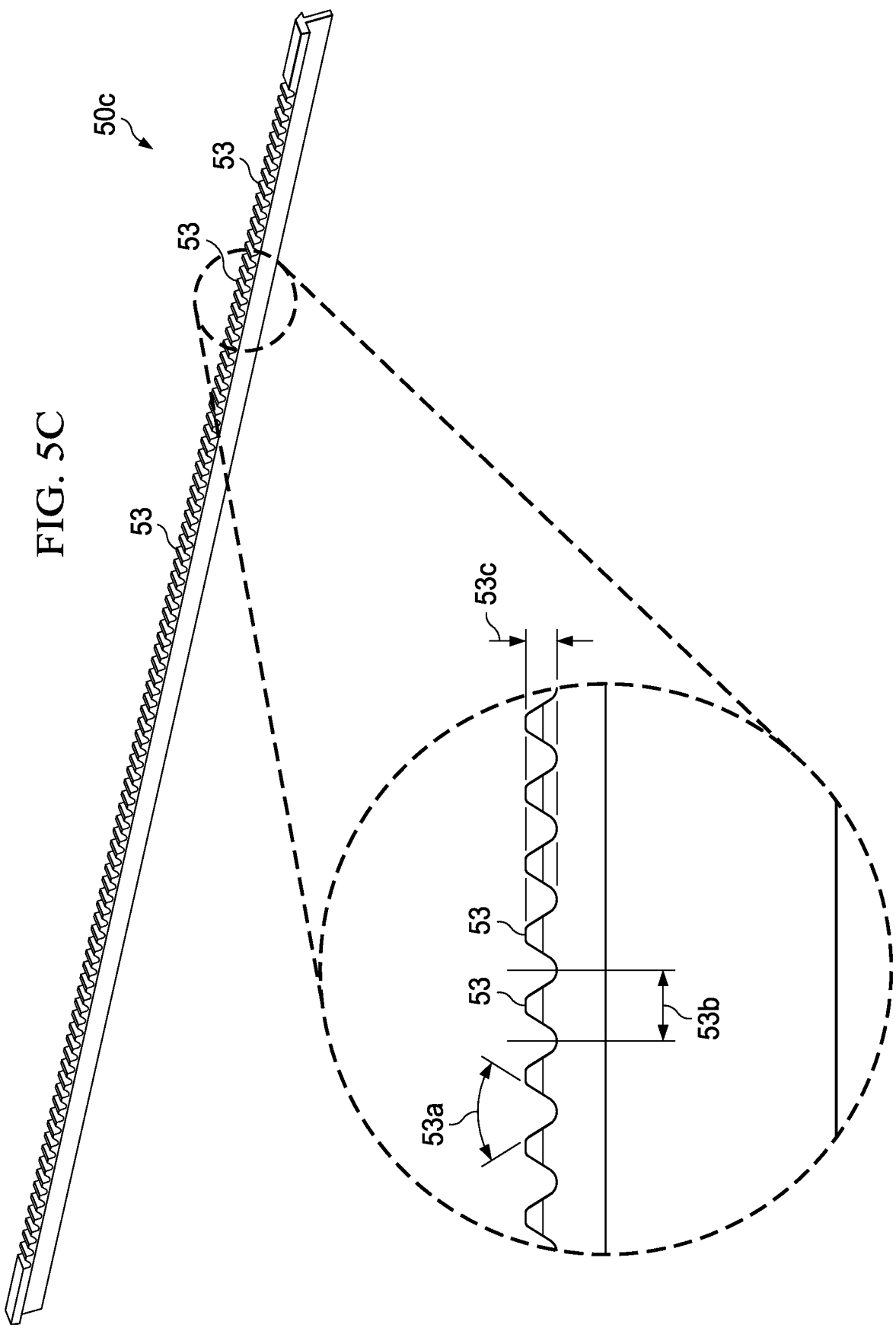
Figure 5G:
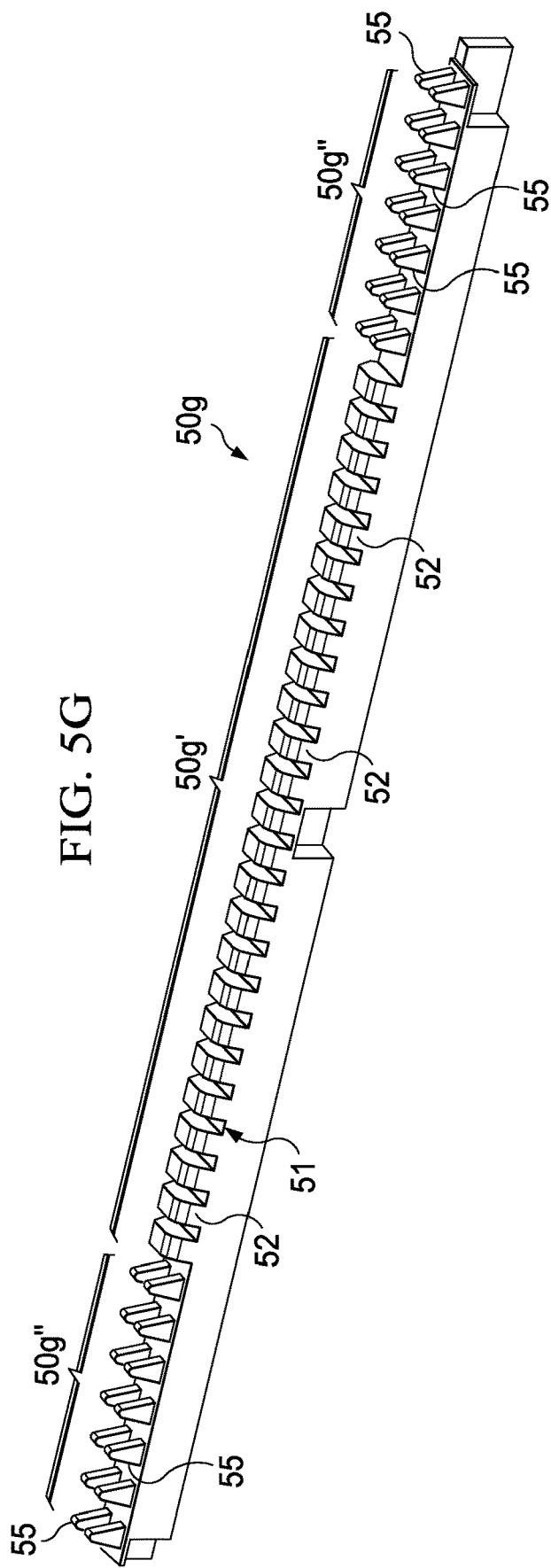
Figure 5H:
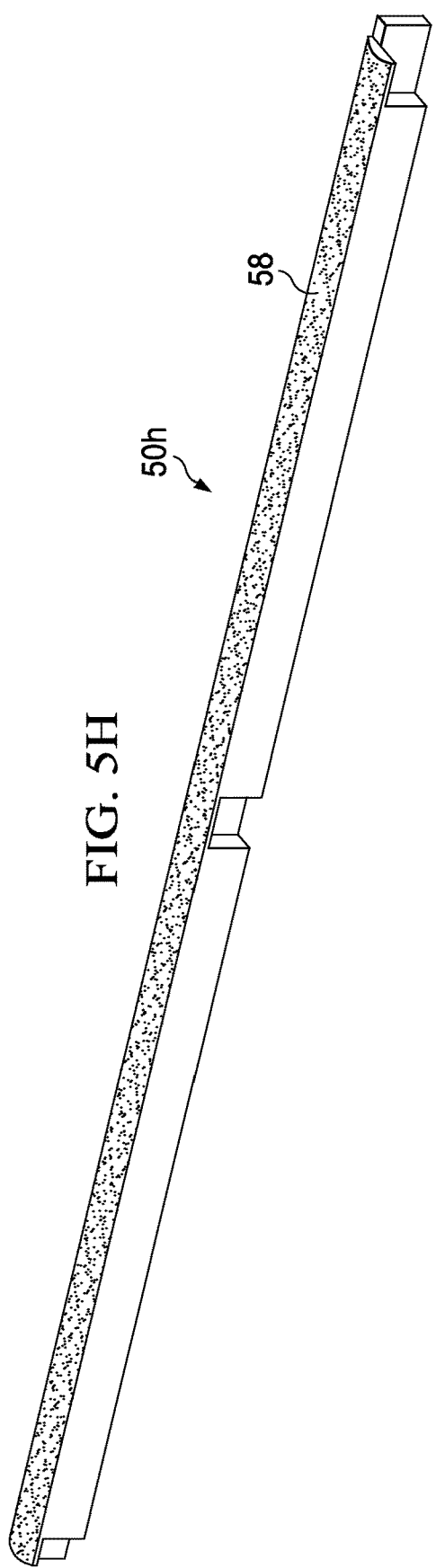
Figure 5I:
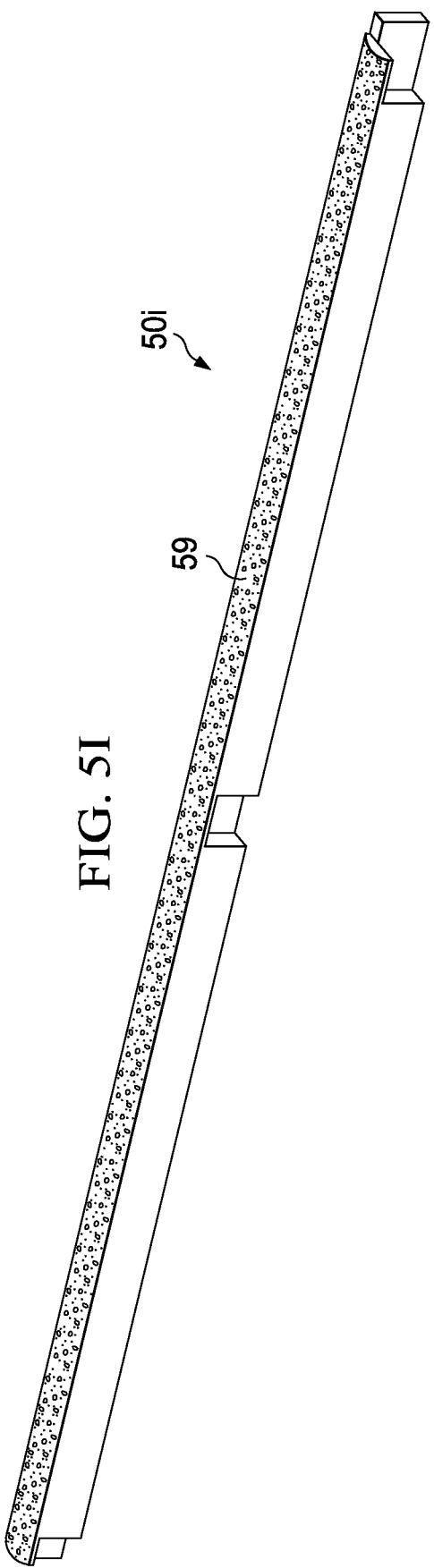
Figure 5J:
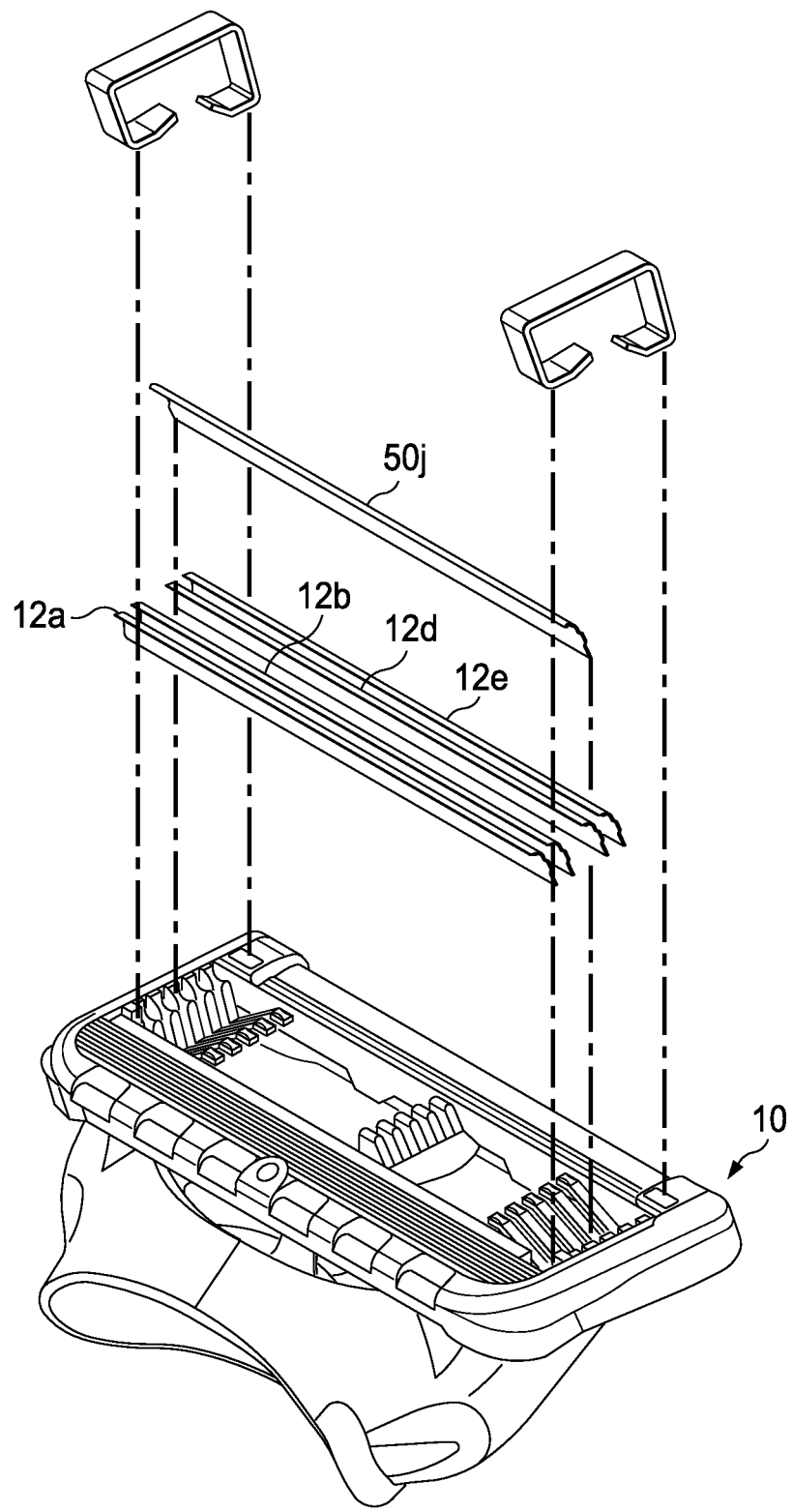
Figure 5K:
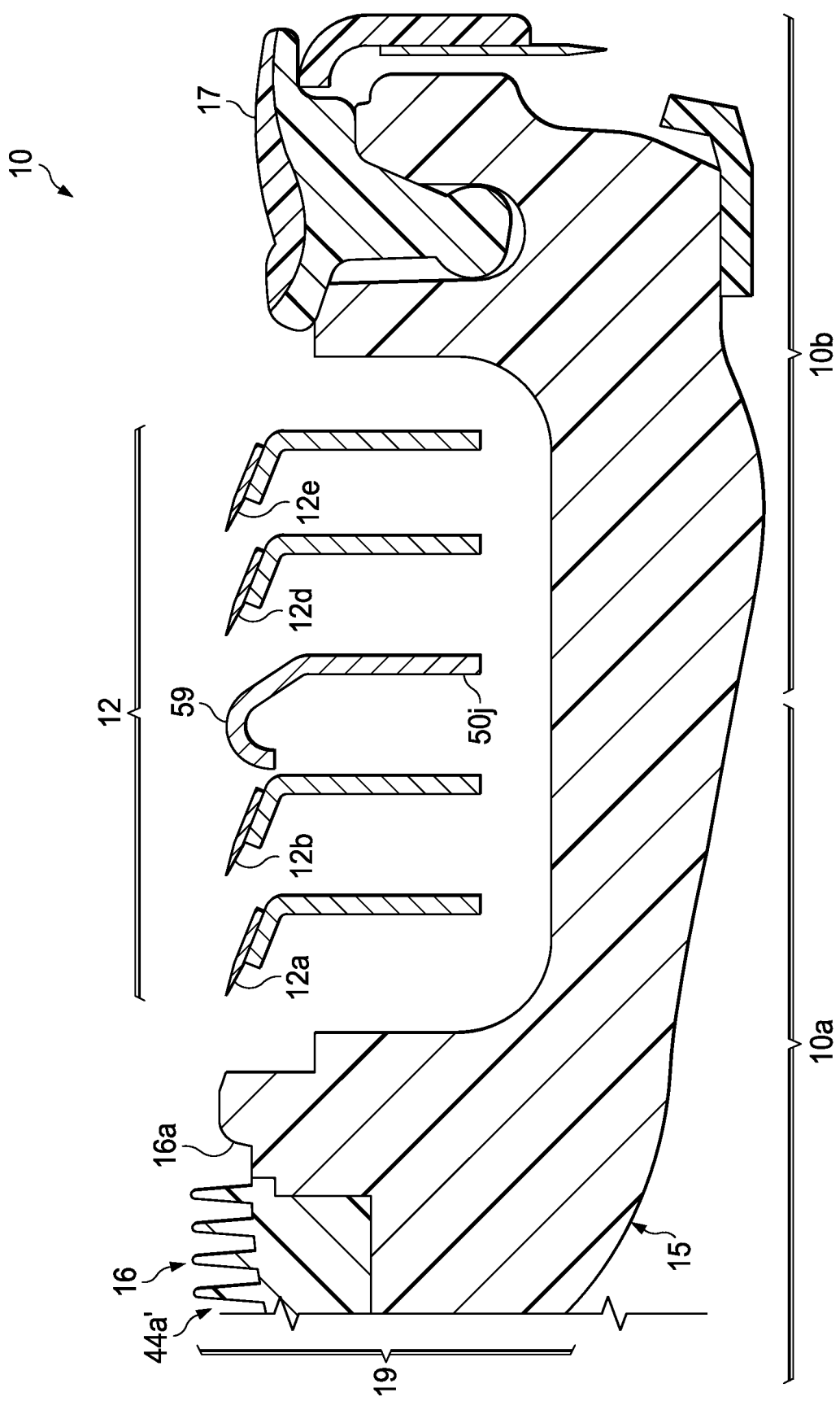
Figure 5L:
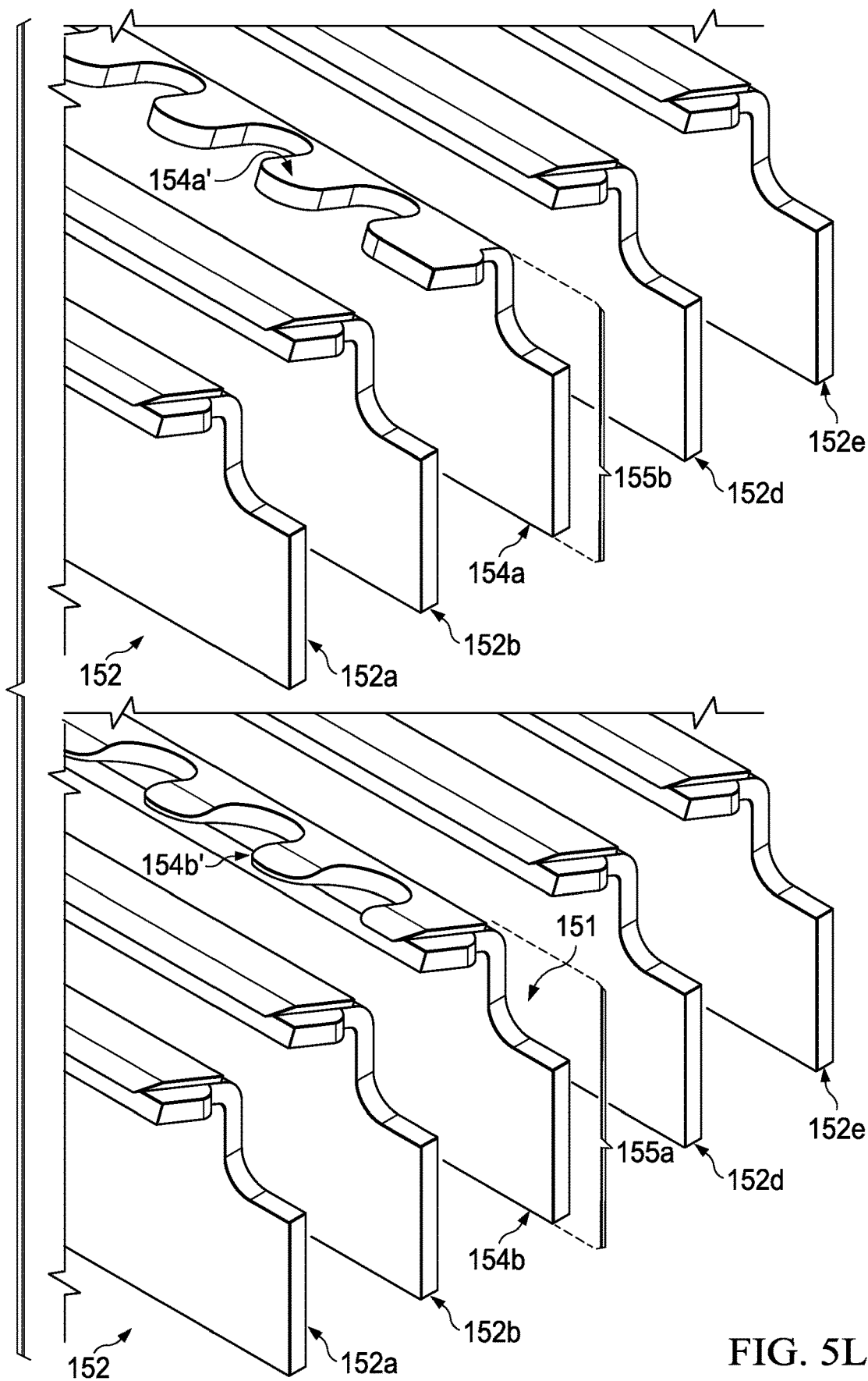
Figure 5M:
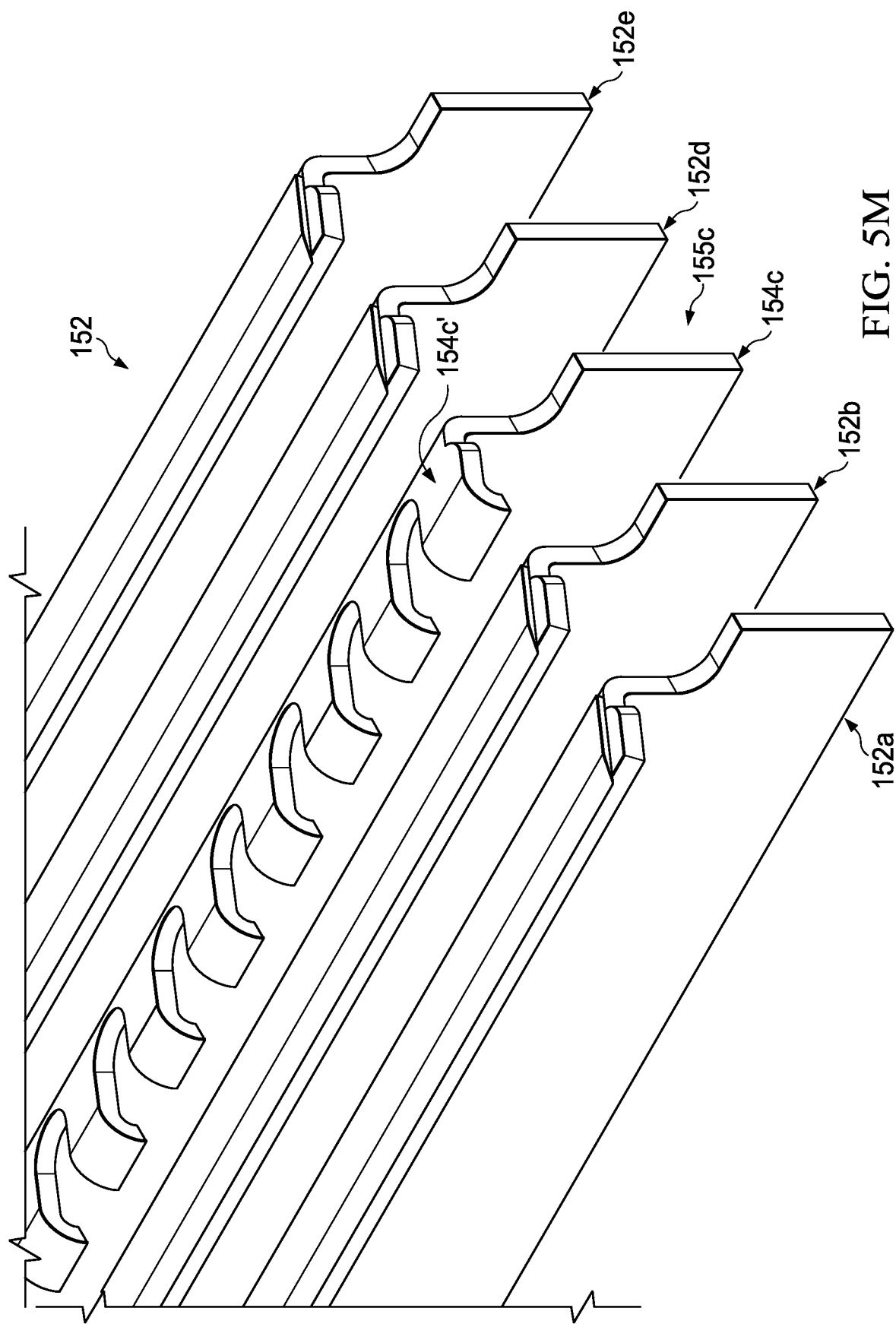
Figure 5N:
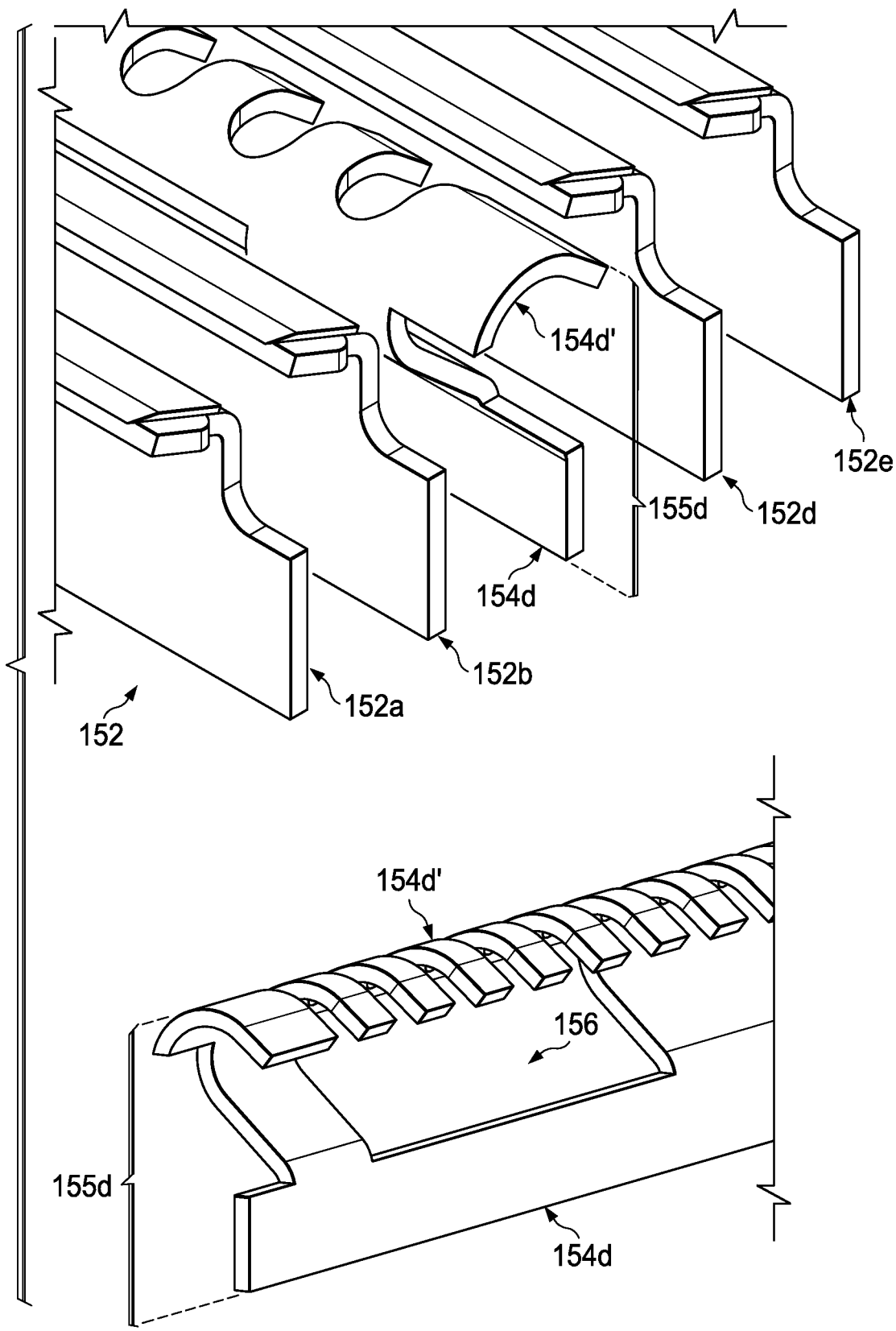
Figure 5O:
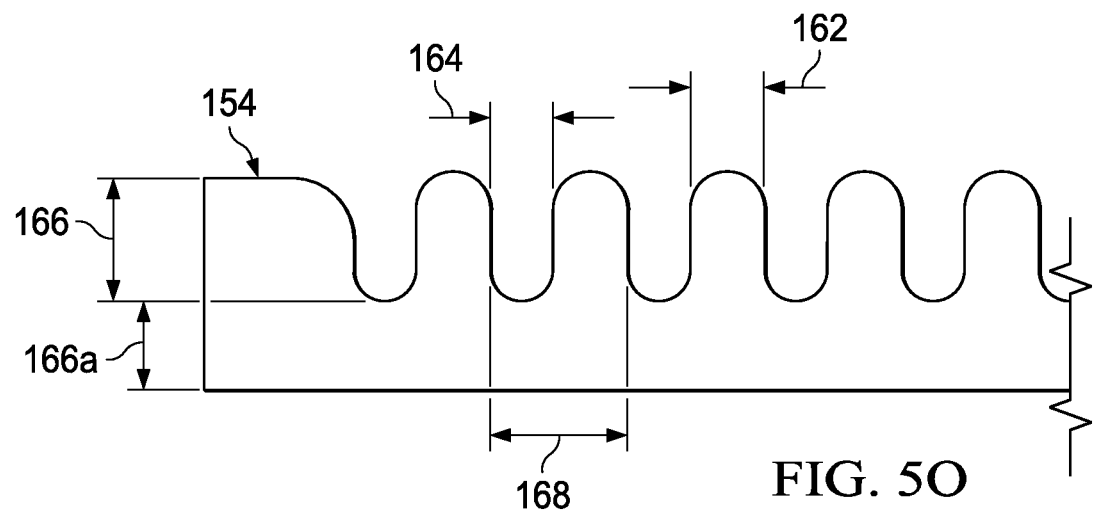
Figure 5P:
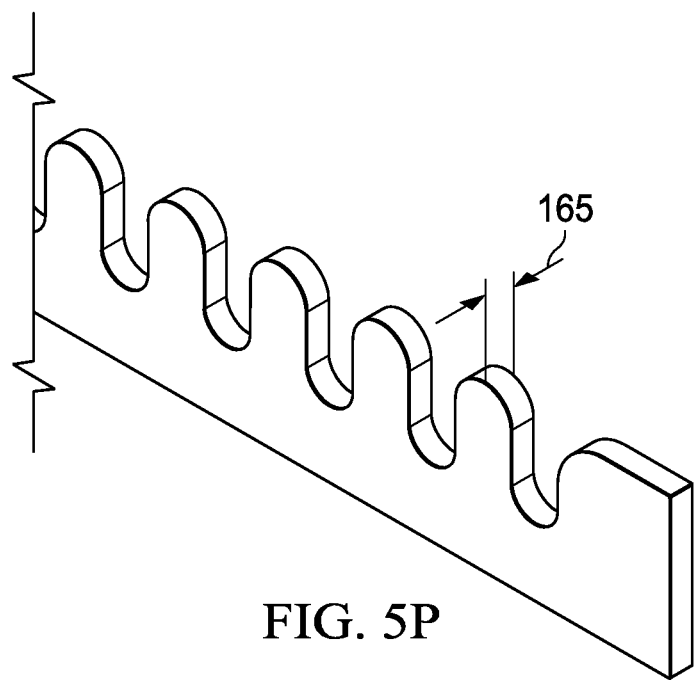
Figure 5Q:
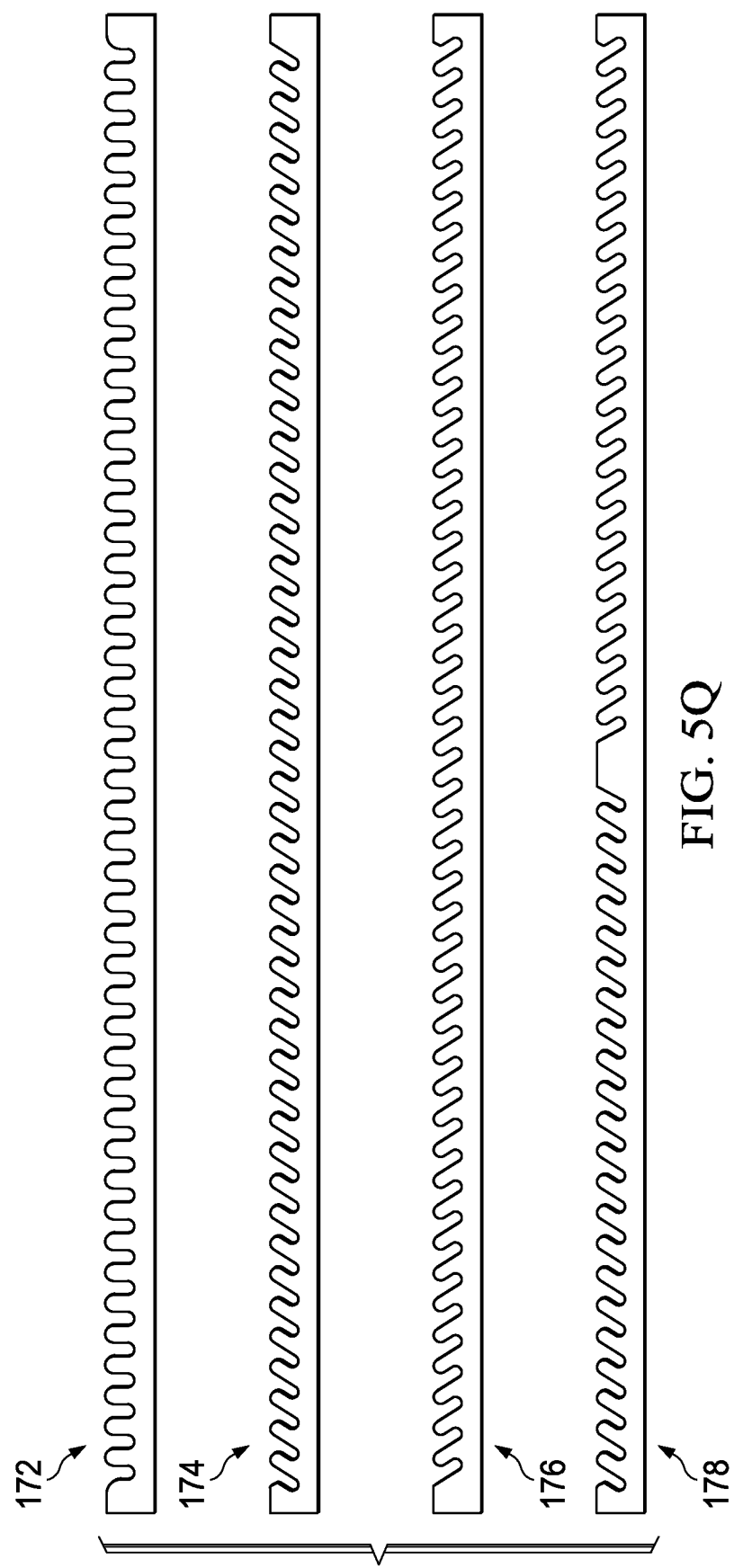

Referring now to FIGS. 5A to 5Q, various designs of non-cutting elements 50 within the scope of the present invention are shown. The types of non-cutting elements described may be generally comprised of polymeric, elastomeric, foam, metal or other materials and may include materials with lubricant, shaving aid, or exfoliation capabilities and accordingly generally formed via injection molding or machining processes.

For instance, in FIG. 5A, a non-cutting element 50a is shown having an upper surface 51 which is substantially planar or flat and a length 51a. The length 51a of non-cutting element may generally be about the same length as that of a conventional blade and may be about 35 mm to 40 mm or desirably about 36 mm. The upper surface 51 of non-cutting element 50a may be formed or molded to take on any shape. As shown in FIG. 5A, the element 50a may have an upper surface 51 that, when viewed traveling in the width-wise direction of the cartridge 10 from the guard 16 toward the cap 17, is slightly rounded or curved in a front portion 51d with a width of desirably up to about 0.2 mm, is substantially flat for a central portion 51e with a width of desirably about up to about 0.3 mm and then has a slanted or downward back portion 51f with a width of desirably up to about 0.4 mm. The overall width 51b of non-cutting element 50a ranges from about 0.1 mm to about 1.2 mm and desirably is about 0.3 mm to about 0.5 mm. The height 51c of non-cutting element 50a may generally be about 1.5 mm. Another possible shape for non-cutting element 50a may be a shape similar to the contour or silhouette of a blade (not shown).

The dimensions of the non-cutting element 50a may generally desirably be within the same ranges as those of a conventional razor blade for ease of placement in a conventional blade array or razor cartridge.

In FIG. 5B, miniature projections, protrusions or nubs 52 are disposed on the upper surface or base 51 of non-cutting element 50 as shown. The present invention contemplates any number of nubs 52 which may each desirably be similar in construction.

The nubs 52 may number from about 50 to 150 and desirably about 50, depending on the spacing, across the length of the non-cutting element 50 where the non-cutting elements of the present invention may generally extend about the same length as the blades. Each nub 52 may have a height measured from a base or surface 51 of non-cutting element 50 to the upper surface 52' of the nub 52 of about 0.25 mm to about 1 mm and desirably about 0.50 mm and a width of about 0.15 mm to about 1 mm and desirably about 0.2 mm to about 0.3 mm measured across the front face 52c or rear face 52c' and a length between about 0.3 mm to about 1.5 mm and desirably about 0.8 mm as measured from a front face of the nub 52c to a rear face of the nub 52c' or from a leading edge 52b to a trailing edge 52b'. The nubs or projections 52 may be much like those found in a conventional guard structure or may be formed or arranged differently, as for instance, described in pending US patent application, entitled Shaving Razors And Cartridges, having Ser. No. 12/542,141, filed on Aug. 17, 2009, assigned to the Assignee hereof, except that for the instant non-cutting element 50b, nubs 52 and open slots 52a described below would have desirably smaller dimensions.

Referring to the close-up view in FIG. 5B, a detailed perspective view of two adjacent projections 52 is shown. An open slot 52a may be defined between the pair of projections 52 disposed next to each other. Since the width of a human hair may be about 0.10 mm, if the width of the open slot 52a is less than about 0.10 mm, then the hair may get caught up in the slot 52a and prevent other hairs from properly passing through the slot and to the blade behind or after the non-cutting element. If the width of the slot 52a is too small, it may hamper proper rinsing of the slot 52a and the blade(s) adjacent the non-cutting element. Shaving aids, hair, dirt and debris may become trapped within the slot 52a, and around the adjacent blades, thus decreasing the effectiveness of the blades to cut hair. This may become even more critical for users that shave infrequently since longer hairs may be even more likely to become trapped and difficult to rinse out. Longer hairs themselves may also be more likely themselves to trap additional hairs, shaving aids, dirt and debris.

The pair of adjacent projections 52 as mentioned define the slot 52a that is dimensioned to track hairs through with little or no interaction with the hair so the hair is not captured, trapped or pulled by projections 52, which may cause discomfort. The slots 52a and projections 52 are spaced to be as small as possible so as to not impede the hair. The slots 52a and projections 52 are also dimensioned to reduce skin bulges within the slots 52a and pressure points at ends of slots 52a, which may result if the projections 52a or slots 52 are spaced too far apart. Skin bulges may lead to the blade edges (e.g., in particular blade 12d, not shown) unnecessarily cutting the skin, resulting in discomfort. The relatively large number of projections 52 over the length of the non-cutting element 50b may serve to distribute the force placed on the skin by the cartridge 10 while the increased number of slots 52a may also increase the number of hairs passing through the slots 52a of the non-cutting element, which may increase the number hairs that are properly cut by the blade edge 13d of blade 12d (not shown) for instance, if arranged as in FIG. 1 for instance of the present invention.

Thus, a chief benefit of nubs 52 disposed on the non-cutting element 50b may desirably be the setting up or the feeding and alignment of the hair via the slots 52a to the blade and/or blades behind the non-cutting element 50b (e.g., in FIG. 1, blades 12d and 12e) which may desirably improve efficiency. Additionally, the projections 52 may serve to massage or increase blood flow in a skin area.

The slot 52a may have the same width from the leading end portion 52b to the trailing end portion 52b' or the slot width may be tapered. The slot 52a's leading end portion 52b receives hairs and the slot's trailing end portion 52b' feeds the hair to the blades in the back of the cartridge (not shown) for cutting. The leading end portion 52b may have width $w_1$, of about 0.1 mm to about 0.5 mm and desirably about 0.20 mm. The trailing end portion 52b' may have a width $w_2$, that is less than $w_1$, to provide a tapered slot 52a for funneling hair to the blade behind the non-cutting element. The leading end portion 52b of the slot 52a may have a chamfer or a lead in (not shown) that tapers from the leading end portion 52b to the trailing end portion 52b' to provide more efficient handling and passage of the hair.

The pitch or spacing in the open slots 52a between a first side surface 52d of one of the nubs 52 to a next first side surface 52d' of the adjacent projection in FIG. 5B may be from about 0.20 mm to about 1 mm and desirably about 0.2 mm to about 0.4 mm.

Though not shown, the slot 52a may extend beyond the front face 52c of the adjacent projections 52 resulting in a slightly greater length of the slot than the length of the adjacent projections 52.

The height of the projections 52 may be tapered or stepped up or down such that the height of the projections 52 near the leading end portion 52b of the slots 52a may be more or less than the height of the projections 52 toward the trailing end portion 52b' of the slots 52a. A step or angled upward design may increase strength of the non-cutting element 50b and may improve the tracking of hair into the slot 52a. Generally, the arrangement in FIG. 5B placed in a razor cartridge may target both short and long hairs.

The nubs 52, as shown, are disposed such that hair will flow in the slots 52a in a transverse direction to the blades (e.g., in the width-wise direction of the cartridge 10, from the guard 16 toward the cap 17). In addition to the transverse arrangement described, in accordance with the present invention, the nubs 52 may, if feasibly desired, also extend parallel to the cutting edges of the blades, at angles, in zigzag, chevron, herringbone or checkerboard patterns, or in any combination thereof.

Referring now to FIG. 5C, non-cutting element 50c is shown having a repeated pattern of waves 53 or small ripples, surf swells or other similar patterns, disposed on its upper surface 51. The waves 53, as indicated in the close-up view of FIG. 5C, depict a wave having desirably 15 degrees and up to about a 60 degree angle opening as shown at angle 53a and a pitch or spacing 53b of about 0.30 mm to about 0.80 mm and desirably about 0.50 mm to about 0.60 mm. The wave height or depth 53c may range from about 0.20 mm to about 1 mm and desirably be about 0.50 mm. The number of waves 53 may range from about 50 to about 100 waves across the length of the non-cutting element 50c and may be desirably about 75 waves.

Depending on the angle opening and other dimensions of the waves 53, the arrangement in FIG. 5C placed in a razor cartridge may aptly target short, low lying hairs that may be missed by the conventional guard in the front of the cartridge.

In FIG. 5D, one or more projections 54 are shown on non-cutting element 50d of the present invention. The projections may be nub or fin-like elements. The projections 54 may desirably be made of metal, plastic, or elastomeric materials. Projections 54 may be arranged in one or more rows or arrays that are parallel, perpendicular, staggered, patterned, angled (or any combination thereof) to the cutting edges of the blades. As shown in FIG. 5D, the projections 54 are arranged in two rows 54a and 54a' extending along the length of the non-cutting element 50d and arranged with a plurality of open slots 54b' in between the projections for allowing the free passage of hair during shaving.

Each nub-like element 54 may have a width 54b of about 0.10 mm to about 1 mm or desirably about 0.4 mm to about 0.5 mm and a height 54d of about 0.30 mm to about 1 mm or desirably about 0.5 mm or 0.60 mm. The projections may have open slots 54c with a width of about 0.15 mm to about 0.8 mm and desirably 0.20 mm and a pitch or spacing 54c' of about 0.25 mm to about 2.0 mm and more desirably about 0.60 mm.

As shown the projections 54 may have slightly rounded tips or curved upper surfaces 54' though any shape for an upper surface 54' is contemplated in the present invention.

In each row of projections 54, there may be about 50 to 80 projections 54 or desirably about 65 to 70 projections 54 disposed along the length 51a of the upper surface 51 of the non-cutting element 50d. As described above in conjunction with nubs 52 in FIG. 5B, the projections 54 may also be arranged (though not shown) with equal dimensions throughout the length 51a of the non-cutting element 50d or with varying dimensions (e.g., tapering or decreasing widths or projection dimensions) or any combination thereof.

By having rounded or curved upper features, the projections 54 in FIG. 5D may provide favorable skin loading and by having two rows of projections 54, the hair may theoretically be better lifted or aligned for the blades behind the non-cutting element to cut them.

In FIG. 5E, a combination of fin-like elements 55 and a lubricating strip 56 are shown, each extending across the length of non-cutting element 50e. This bifurcated arrangement may be beneficial for a multi-stage cartridge, as described above in conjunction with FIG. 4B, for instance where the non-cutting element acts as a cap or lubricating strip in the first cartridge unit 10a or first stage and acts as a guard in the second cartridge unit 10b or second stage. The fin-like elements 55 of non-cutting element 50e may be of or similar to the type described above in conjunction with FIG. 5D or slightly finer in dimensions and more flexible. The lubricating strip 56 may comprise a material of any known type of lubricating strip and may, for instance, include aloe, vitamin E, minerals or oils. The two portions 55 and 56 of the non-cutting element 50e may be attached together via any known and desirable method of attachment, such as but not limited to, seals, adhesives or other known mechanical means. If feasible, more than two portions may be attached together forming one non-cutting element 50e of the present invention.

An area or valley 57 is formed extending across the length 51a of non-cutting element 50f as shown in FIG. 5F and desirably may include a material 57a such as any type of composition or shaving aid disposed into valley 57. The composition or shaving aid material may desirably be secreted or exuded when the skin, hair, water or other fluid contacts the non-cutting element 50 providing improved skin flow control during shaving.

In FIG. 5G, a combination of nubs 52 and fin-like elements 55 are shown in various portions along the length of non-cutting element 50g. For instance, nubs 52 of FIG. 5B may be arranged in the central area 50g' of element 50g as shown in FIG. 5G while fin-like elements 55 similar to those of FIG. 5E are arranged on outer portions 50g". This arrangement may provide added comfort or skin protection closer to ends of the blades in outer portions 50g" where the fin-like elements are disposed while providing improved hair flow or control closer to the center area 50g' of the blades where the nubs are disposed. It should be noted that any such combination of any type of non-cutting elements is contemplated in the present invention.

FIG. 5H depicts the non-cutting element 50h with an exfoliation layer 58 disposed on its upper surface 51. Such an exfoliation layer may desirably comprise fine grade abrasive coatings or surface texture capable of removing at least a portion of a layer of skin, for example, in flakes or scales. Also, the exfoliating layer 58 of the present invention may increase blood flow to a skin area or include ingredients capable of peeling or scaling off small portions of an upper layer of skin (e.g., to remove dead cells).

FIG. 5I depicts the non-cutting element 50i as a sponge or foam 59 which may or may not be embedded with a shaving aid material such as a lubricant. If embedded with a lubricant, the element 50i may provide improved glide, increased skin flow and/or other skin improvement or protection while the skin moves smoothly over the non-cutting element 50i. Such skin control or management may be desirable if non-cutting element 50i were positioned midway through the cartridge as depicted in FIG. 1 for instance.

FIG. 5J depicts the non-cutting element 50j desirably formed as a modified or extended blade support made of any material but advantageously comprised of the same type of metal conventionally used for a blade support. Arrows pointing downward in FIG. 5J indicate the top-down loading of the non-cutting element 50j and blades 12a, 12b, 12d, and 12e into the cartridge 10.

In the cross-sectional side view of FIG. 5J shown in FIG. 5K, the non-cutting element 50j of the present invention may have any shape such as L-shape, a blade silhouette, or have a desirably curved or round leading edge or hook-like structure 59 as shown in FIG. 5K. The curve or hook-like structure 59 provides a smoother surface for the skin to contact as it moves past the non-cutting element 50j, thereby improving user comfort.

The present invention contemplates any viable structure for the modified blade support type of non-cutting element 50j. For instance, as shown in FIG. 5J, element 50j may be a unitary or single element (e.g., one piece). Thus, one method of manufacturing non-cutting element 50j may be to modify the blade support and rather than weld a blade with a cutting edge to the top surface of the blade support, extend the blade support profile. The element 50j may also be coated with polytetrafluoroethylene (PTFE) or other desirable coatings. Having a similar construction to a standard blade support allows the element 50j to be capably handled by conventional razor cartridge equipment without a need or expense for equipment modification.

Another method of manufacturing such a non-cutting element (not shown) may be to couple or attach a non-cutting element (such as those described above with regard to FIGS. 5A to 5I) to a top area or upper part of a modified blade support either by welding, mounting or otherwise attaching the non-cutting element to the blade support portion (e.g., by adhesive or mechanical or thermal means). This may be considered a two-piece modified blade support structure. For instance, the blade support may be extended to include or have disposed on it, one or more fin-like elements or projections onto its top surface, forming an alternative type of modified blade support, or a non-cutting element within the scope of the present invention which may be capable of feeding or lifting hairs towards the blades behind the non-cutting element. Thus, the non-cutting element of the present invention may, if practical, include a one-piece or a two or more piece modified blade support. In either instance, the non-cutting element would not be a cutting element.

One-piece and two-piece non-cutting elements are shown in FIG. 5L, which in turn depicts an alternate embodiment of the present invention where a non-cutting element 154a or non-cutting element 154b may have an upper surface formed as, or augmented with, a kind of comb, or comb-like features having a plurality of teeth which may be desirably rigid but may be flexible or semi-rigid or any combination thereof. The upper surface of non-cutting element 1540a is shown as having a square edge 154a' while the upper surface of non-cutting element 154b is shown as having a tapered edge 154b'.

The non-cutting element may be a two-piece assembly 155a or a one-piece assembly 155b. As shown in blade array 152 in FIG. 5L, the two-piece assembly type 155a may be desirably located in the middle of the blade array 152 having two blades 152a, 152b in front and two blades 152d and 152e in back of the non-cutting element 154b which is depicted as a two-piece assembly 155a. The two-piece assembly of non-cutting element 154b may be produced in a manner similar to that of a standard blade assembly since the comb non-cutting element 154b desirably has similar geometry to a standard blade and thus may be joined to a conventional blade support element 151 by laser welding or other techniques known to those of skill in the razor arts.

The one-piece assembly 155b, also shown disposed in the center of the blade array 152, includes the square edged upper surface 154a' of non-cutting element 154a contacting a user's skin surface and is formed as a single bent element or as a modified blade support as described above in conjunction with FIGS. 5J-5K.

Both non-cutting elements 154a and 154b may be considered 'drop in' replacements for a standard blade and blade support assembly.

Referring now to FIG. 5M, another alternative embodiment of the present invention is shown where non-cutting element 155c is depicted as having a single bent element 154c similar to the one-piece comb structured non-cutting element 155b of FIG. 5L except that non-cutting element 155c desirably may also include a rounded upper surface 154c' contacting the skin surface. As above, non-cutting element 155c may be considered a 'drop in' replacement for a standard blade and blade support assembly as shown in its central location in blade array 152.

FIG. 5N depicts still yet another alternative embodiment of the present invention where non-cutting element 155d is depicted as a single bent element 154d with a rounded upper surface 154d' contacting the skin surface. However, the orientation shown is reversed from that of comb embodiments shown in FIGS. 5L and 5M. The opening 156 shown in non-cutting element 154d shown may be sized and shaped to allow the non-cutting element 155d to ease or slip over cartridge spring fingers or the like, during assembly.

The reverse orientation of the combs in FIG. 5N may desirably contact the skin in a similar fashion as the other combed non-cutting elements of FIGS. 5L and 5M. By having the non-cutting element 155d extending backward to the trailing blade 152d as shown in FIG. 5N, the non-cutting element 155d may desirably better lead the hair all the way to the trailing cutting edge than embodiments of FIGS. 5L-5M which depict the comb feature well in front of the trailing blade 152d and thus may theoretically not aptly lead the hair all the way to the trailing blade.

This reverse orientation may additionally serve to maximize the radius of contact with the skin and guide the hair to the trailing blade edge. The radius of contact will be described in more detail below. However, just as above, non-cutting element 155d may be considered a 'drop in' replacement for a standard blade and blade support assembly as shown by its location in blade array 152.

The non-cutting elements with combs described above with regard to FIGS. 5L-5N may be, as described in conjunction with other types of non-cutting elements, positioned in close proximity (e.g., about 50 μm or greater) to the blade 152b preceding, or the blade 152d following the non-cutting element. In general, the rinse-through gaps for embodiments in FIGS. 5L-5N may be of similar dimensions as those described above with regard to FIG. 2. Similarly, the spans, BTAs and exposure may be similarly modified as mentioned above in FIGS. 4D for instance (e.g., narrow span, increase in BTA, negative exposure of trailing blade), may desirably provide an improved blade tip loading on the skin and improve the numbers of hairs that are cut without skin damage.

It has been determined to be desirable to place the trailing blades or the blade just after the non-cutting element very close in proximity to the non-cutting element so as not to miss hairs that have been aligned and guided by the non-cutting element.

In accordance with the present invention, the desirable ranges of dimensions of the structural aspects of the comb or teeth of non-cutting elements are shown in greater detail in FIG. 5O. For instance, the width of a tooth 162 of the non-cutting elements depicted above in FIGS. 5L-5N, may desirably range from about 100 μm to about 2000 μm and be more desirably about 500 μm and the gap width or open slots defined between teeth 164 may desirably range from about 100 μm to about 2000 μm and be desirably about 500 μm. Generally, the gap width 164 allows the free passage of hair during shaving. The gap depth (or tooth height) 166 may desirably range from about 100 μm to about 2000 μm and be desirably about 650 μm, while the gap pitch 168 which may be generally deduced by adding the dimensions of gap width 164 and tooth width 162 together, may desirably range from about 200 μm to about 4000 μm and be desirably about 1000 μm. The total depth (or total height) which may include the gap depth 166 and a bottom depth section 166a of the non-cutting element may generally be about the same as a standard blade assembly, typically about 0.09inches or about 2.29mm. The length (or thickness) 165 of each tooth, as depicted in FIG. 5P may range from about 75 μm to about 250 μm and more desirably may be about 150 μm.

It should also be noted that in accordance with the present invention, any of these dimensions described herein may be constant or variable along the length of the non-cutting element.

Referring now to FIG. 5Q, top views of various "comb" embodiments contemplated, but not limited to, by the present invention. The orientation of the teeth in the non-cutting element 172 may be straight or in general, parallel to the direction of the shave. The orientation of the teeth in the non-cutting element 174 may be angled right, in the non-cutting element 176 may be angled left, and in the non-cutting element 178 may be angled towards the center. The differences in orientation may provide benefits to areas of the skin being shaved. For instance, angled orientations may improve shaving (e.g., efficiency) in hard-to-shave areas such as the neck, chin, knees, or underarms.

Advantageously, non-cutting elements, arranged or augmented with combs in their upper surface such as those described in FIGS. 5L, 5M, and 5N may, as in embodiments described above (e.g., FIGS. 5B, 5D) also desirably serve to agitate skin to free or release hairs trapped under the skin surface, or other low-lying hairs, align the hairs for the trailing blades, thus preventing hairs from rotating out of the way, and preventing or reducing the skipping of hairs as well as providing rinsing benefits. Such combs or comb-like features (e.g., teeth) on non-cutting elements may desirably assist in aligning the hairs and then disengaging the hairs in time for the following proximal blade (or blades) to cut more hairs, both in extent and number. Thus, efficiency is improved as these hard-to-shave areas may be more easily dealt with via combs or other hair-aligning features on a non-cutting element. Additionally, by offering the ability to guide hairs directly into the cutting blades, and increasing the hairs cut, the non-cutting elements with comb-like features (e.g., teeth) may generally improve the feel of smoothness just after shaving.

Figure 5R:
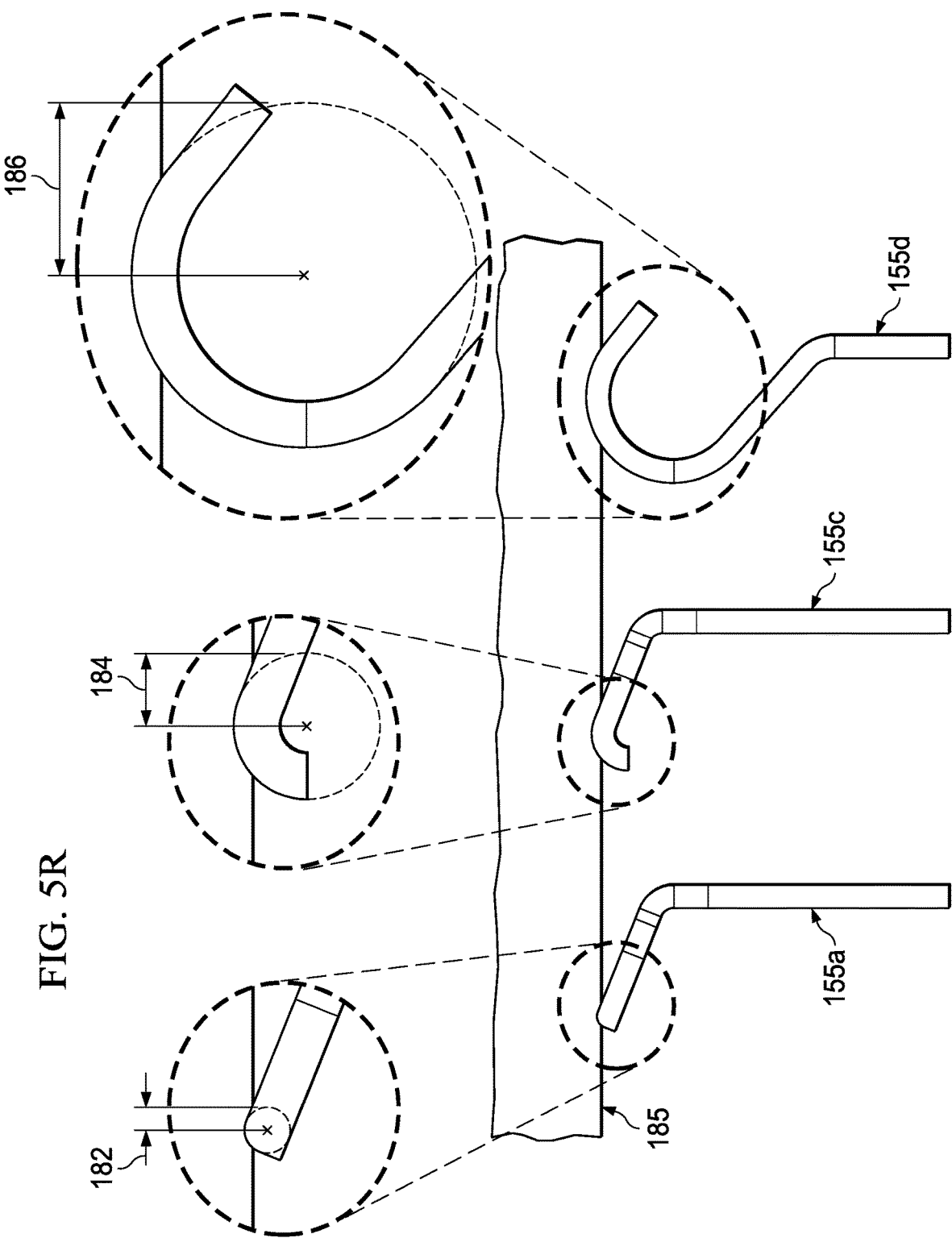

Referring to FIG. 5R, various radii of contact for different non-cutting elements of the present invention are shown. The radius of contact 182*a*, 182*b*, and 182*c* is shown for non-cutting elements (depicted as similar to non-cutting elements 155*a*, 155*c*, and 155*d*, respectively), and represents the radius length of the contact "circle" formed by the upper surface of the non-cutting element to a user's skin surface 185. As can be seen, radius of contact 182*a* for non-cutting element 155*a* is generally the smallest and desirably less than about 25 μm, while the radius of contact 182*b* for non-cutting element 155*c* is a little larger and desirably about 250 μm and the radius of contact 182*c* for non-cutting element 155*d* is the largest of the three shown and desirably about 550 μm. Theoretically, all other conditions remaining the same, generally the smaller the radius of contact, the higher the pressure on the skin whereas generally, the larger the radius of contact, the lower the pressure on the skin. Higher pressure may be undesirable as a user may feel it is too scratchy or rough, while less pressure may not rate or feel as nice as some higher pressure alternatives. Thus, a balance may advantageously need to be struck between different types of non-cutting elements and their radius of contact to obtain optimal pressure.

While the non-cutting elements described thus far are generally loaded into or installed into blade positions or slots from the top of the blade array or cartridge (e.g., similar to razor blade installation), the present invention is not limited to placement of non-cutting elements in conventional blade positions or blade slots.

Other methods of manufacturing a non-cutting element for placement within a blade array will be disclosed below.

Figure 6:
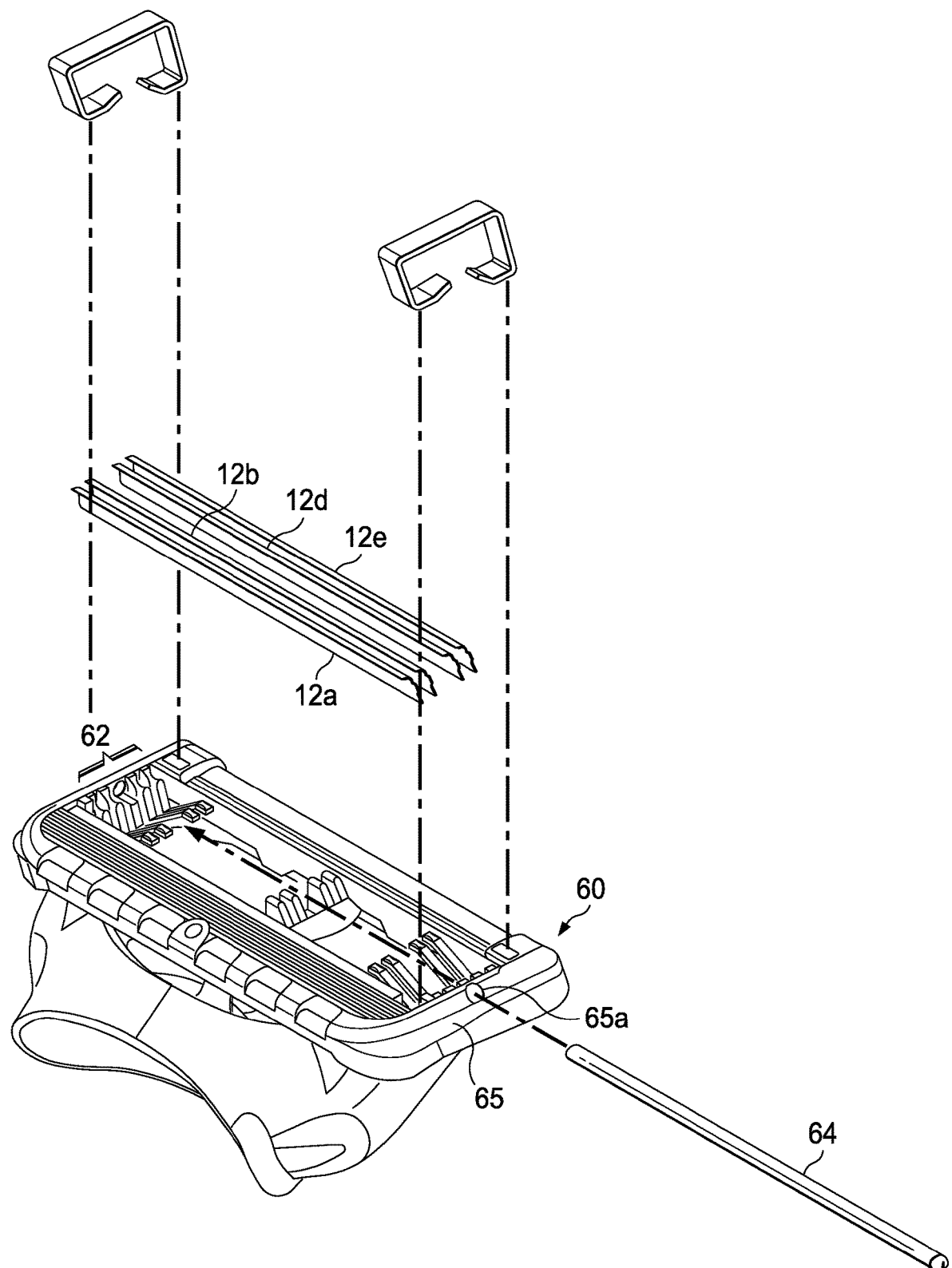
FIG. 6 is a perspective view of an alternate embodiment of a non-cutting element in accordance with the present invention.

The non-cutting element of the present invention may, for instance, be loaded into the blade array 62 via at least one hole, aperture or slot 65*a* disposed in at least one of the sides of the cartridge frame 65 as shown in FIG. 6 where non-cutting element 64 is of a generally round shape but may be of any shape, structure, or composition within the scope of the present invention. Hole 65*a* may desirably be sized and structured to be able to effortlessly insert and generally hold the non-cutting element 64 in place within the blade array 62 and therefore, within the razor cartridge 60.

Thus far, the non-cutting element of the present invention has been described as being an independent, standalone, or separable element or elements, much like the razor blades themselves. Given that the instant element is a non-cutting element with no cutting edges, alternate methods for providing such a non-cutting elements in a razor cartridge may also be within the scope of the present invention. Such alternative embodiments of the present invention are described below.

Figure 7:
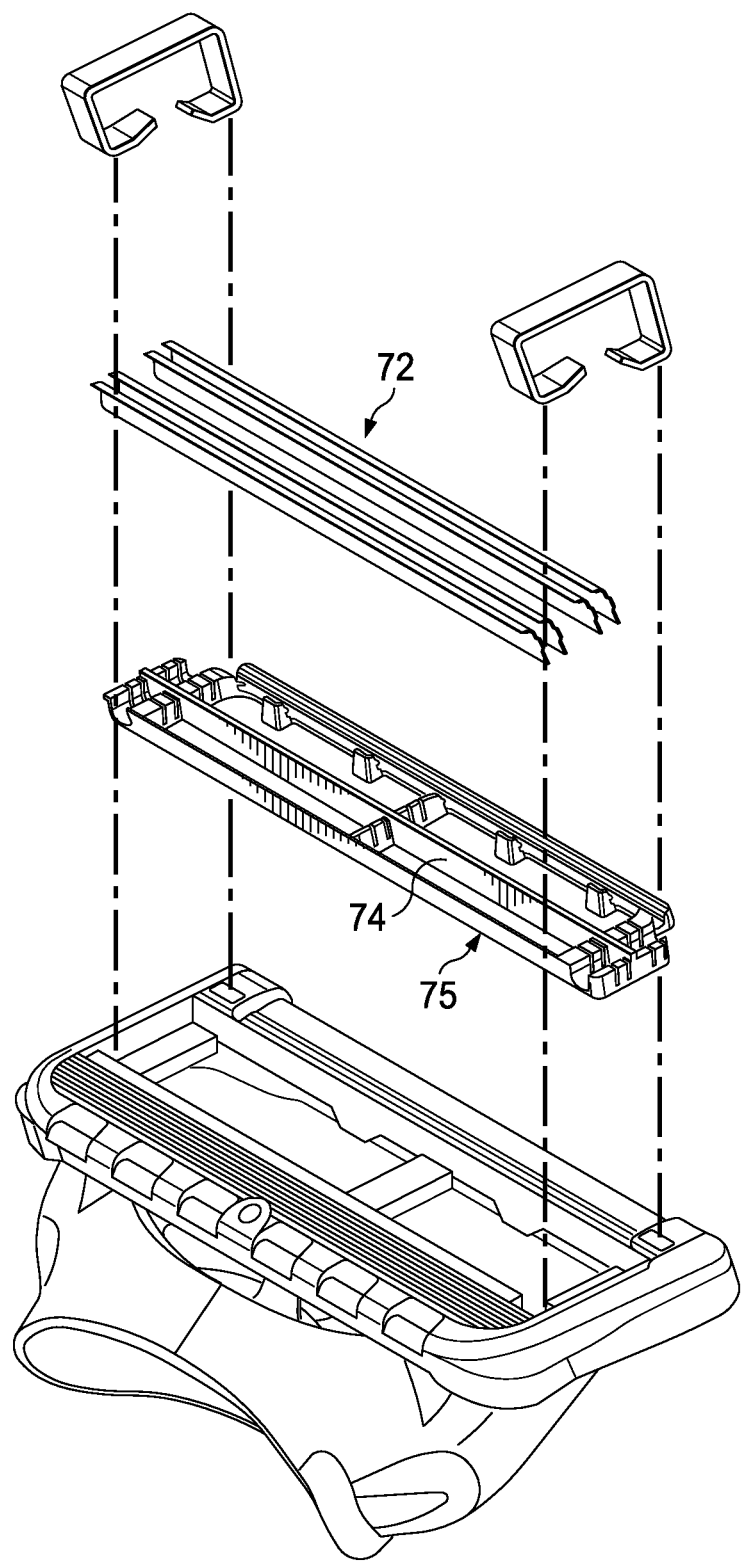
FIG. 7 is a perspective view of yet another alternate embodiment of a non-cutting element in accordance with the present invention.

Referring now to FIG. 7, one such exemplary alternate embodiment of the present invention is shown to include at least one non-cutting element 74 formed as a portion of the frame 75 as shown in the close-up view of the frame 75 in FIG. 7. For instance, the frame 75 may be injection-molded to include at least one non-cutting element 74 desirably positioned lengthwise in any location in the cartridge, as generally described above with regard to FIGS. 1-3. The non-cutting element may also be coupled to the frame via a snap fit or other known connection. Non-cutting element 74 may be coupled to the frame 75 using other mechanical, thermal, chemical methods known to those of skill in the art. It should be noted that the non-cutting element, though formed together with the frame, is not attached to or integrated with a razor blade or blades. The non-cutting element, though part of the cartridge frame, may be of any type and may, for instance, include an upper surface of projections, nubs or fin elements (not shown) of elastomeric or other material.

Figure 8:
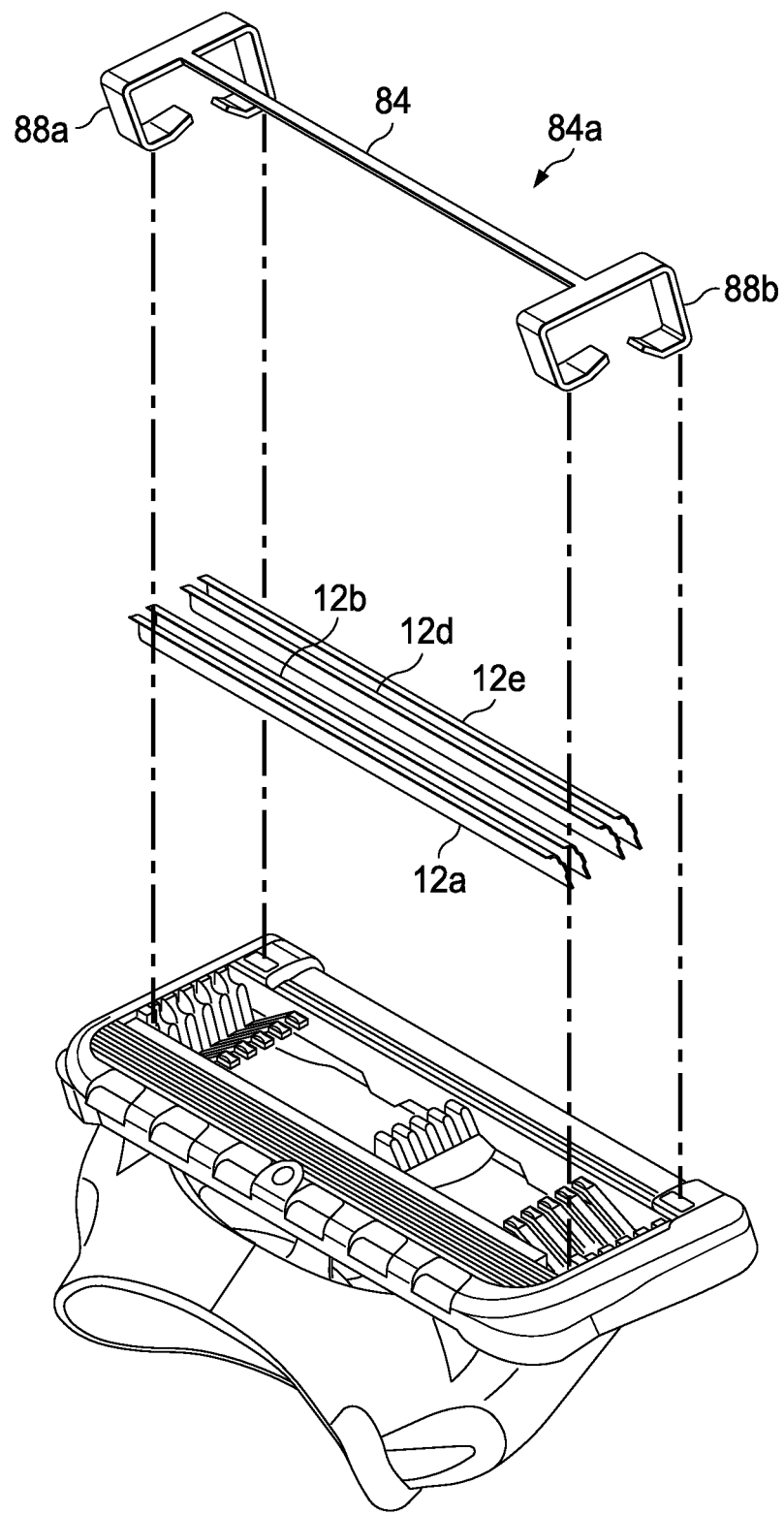
FIG. 8 is a perspective view of still yet another alternate embodiment of a non-cutting element in accordance with the present invention.

Additionally, in FIG. 8, another exemplary alternate embodiment depicts a non-cutting element 84 formed as a portion of both of the clips 88*a* and 88*b* as a unitary structure 84*a* and therefore necessarily installed into the frame (or cartridge) when the clips are installed. Though not shown, more than one non-cutting element may be formed as a portion of the clips or the non-cutting element may be formed as a portion of only one or the other clip 88*a* or 88*b*, respectively, in accordance with the present invention. Such a structure 84*a* may be made by one of skill in the art using the same methods as conventional clips and may be machined, molded, or formed in any feasible manner.

Though the non-cutting element 74 may be formed as a portion of the frame 75 and non-cutting element 84 may be formed as a portion of the clips 88*a*, 88*b*, both being formed as part of another razor component, they are generally not attached to or integrated with any of the blades. The shaving advantages attributed to having at least one non-cutting element within the blade array remain unchanged.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor cartridge comprising:
   one or more razor blades, each of said razor blades having a cutting edge;
   at least one non-cutting element;
   a frame having a plurality of blade positions wherein each of said one or more razor blades and each of said at least one non-cutting element is disposed in a separate one of said plurality of blade positions such that every razor blade is spaced apart from each said at least one non-cutting element, wherein each said cutting edge of said one or more razor blades is directed toward a front of said cartridge and wherein a rinse-through gap is provided immediately before and immediately after said at least one non-cutting element.

2. The razor cartridge of claim 1 wherein said at least one non-cutting element is disposed in any of said blade positions of said frame.

3. The razor cartridge of claim 1 wherein each said cutting edge of said razor blades faces in the same direction.

4. The razor cartridge of claim 1 wherein said at least one non-cutting element is not attached to any of said one or more blades.

5. The razor cartridge of claim 1 wherein each of said blade positions comprises a slot, an opening, or any combination thereof.

6. The razor cartridge of claim 1 wherein a portion of said at least one non-cutting element is contiguous, non-contiguous, planar, non-planar, rigid, flexible, semi-rigid, or any combination thereof.

7. The razor cartridge of claim 1 wherein said at least one non-cutting element is comprised of at least one polymeric, elastomeric, urethane, olefin, rubber, textile, natural, metal, foam, sponge, lubricant, shaving aid, or exfoliation material, or any combination thereof.

8. The razor cartridge of claim 1 wherein said at least one non-cutting element is a modified blade support.

9. The razor cartridge of claim 1 wherein an upper surface of said at least one non-cutting element comprises at least one feature selected from the group consisting of a plurality of projections defining at least one open slot, protrusions, elongated filaments, nubs, fins, waves, curves, depressions, hair-like elements, one or more hook-like structures, one or more lubricating strips, one or more foams, one or more exfoliation materials, one or more shaving aid materials, one or more comb-like features having a plurality of teeth, any of the aforementioned spaced apart or interconnected, constant or variable in dimension, upstanding, curved, angled right, angled left, or angled to a center, or any combinations thereof.

10. The razor cartridge of claim 9 where an upper surface of said at least one non-cutting element comprises a plurality of teeth defining a plurality of open slots extending generally transverse to the cutting edge, wherein said open slots have a width from about 0.10 mm to about 2.00 mm for allowing the free passage of hair during shaving.

11. The razor cartridge of claim 10 wherein said teeth have a height of about 0.10 mm to about 2.00 mm, a width of about 0.10 mm to about 2.00 mm, and a length of about 0.075 mm to about 0.25 mm.

12. The razor cartridge of claim 1 where an upper surface of said at least one non-cutting element comprises a plurality of projections defining a plurality of open slots extending generally transverse to the cutting edge, wherein said open slots have a width from about 0.10 mm to about 0.50 mm for allowing the free passage of hair during shaving.

13. The razor cartridge of claim 12 wherein said projections have a height of about 0.25 mm to about 1.00 mm, a width of about 0.15 mm to about 1.00 mm, and a length of about 0.3 mm to about 1.50 mm.

14. A razor cartridge comprising:
    a blade array comprising one or more razor blades, each of said blades having a cutting edge; and
    at least one non-cutting element disposed in said blade array wherein said at least one non-cutting element is not attached to any of said one or more blades such that every razor blade is spaced apart from each said at least one non-cutting element, wherein each said cutting edge of said one or more razor blades is directed toward a front of said cartridge and wherein a rinse-through gap is provided immediately before and immediately after said at least one non-cutting element.

15. A razor cartridge comprising:
    a first stage comprising a guard, at least one razor blade and at least one non-cutting element, and wherein a rinse-through gap is provided immediately before and immediately after said at least one non-cutting element; and
    a second stage comprising said at least one non-cutting element, at least one razor blade and a cap, wherein said at least one non-cutting element is disposed anywhere between said guard and said cap and every razor blade is spaced apart from each said at least one non-cutting element, wherein each cutting edge of said at least one razor blade is directed toward a front of said cartridge.

16. The razor cartridge of claim 15 wherein said non-cutting element may be formed from two non-cutting members.

17. The razor cartridge of claim 15 wherein said non-cutting element comprises cap capabilities adjacent said first stage and guard capabilities adjacent said second stage.

18. The razor cartridge of claim 15 wherein spans between said blades in said second stage are narrower than spans between said blades in said first stage.

19. The razor cartridge of claim 15 wherein a span between said non-cutting element and said at least one razor blade in said second stage directly behind said non-cutting element is about 50 μm.

20. The razor cartridge of claim 15 wherein a blade tangent angle of at least one of said blades in said second stage is higher than a blade tangent angle of said blades in said first stage.

21. The razor cartridge of claim 15 wherein at least one of said blades in said second stage has a negative exposure relative to said non-cutting element.

22. A method of manufacturing a razor cartridge comprising the steps of:
    coupling at least one non-cutting element with at least one razor component in a position of said cartridge; and
    inserting a plurality of razor blades into positions of said cartridge, wherein every razor blade is spaced apart from each said at least one non-cutting element, wherein each cutting edge of said plurality of razor blades is directed toward a front of said cartridge, wherein a rinse-through gap is provided immediately before and immediately after said at least one non-cutting element, and wherein said razor component is a frame, at least one clip, or any combination thereof, and said coupling further comprises injection molding, machining, mechanical attachment, chemical attachment, or any combination thereof.

* * * * *